United States Patent
Jeon et al.

(10) Patent No.: US 10,686,923 B2
(45) Date of Patent: *Jun. 16, 2020

(54) MOBILE TERMINAL

(71) Applicant: LG Electronics Inc., Seoul (KR)

(72) Inventors: Taehwan Jeon, Seoul (KR); Donghan Kang, Seoul (KR); Joontae Kim, Seoul (KR); Janghwan Shim, Seoul (KR); Byungkil Choi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/287,503

(22) Filed: Feb. 27, 2019

(65) Prior Publication Data

US 2019/0199839 A1 Jun. 27, 2019

Related U.S. Application Data

(63) Continuation of application No. 15/942,964, filed on Apr. 2, 2018, now Pat. No. 10,250,729.

(Continued)

(30) Foreign Application Priority Data

Dec. 6, 2017 (KR) .................... 10-2017-0167036

(51) Int. Cl.
*H04M 1/02* (2006.01)
*H04M 1/18* (2006.01)
(Continued)

(52) U.S. Cl.
CPC ............ *H04M 1/18* (2013.01); *G06F 1/1656* (2013.01); *G06F 1/1688* (2013.01); *H04B 1/38* (2013.01);
(Continued)

(58) Field of Classification Search
CPC .......... H04M 1/18; H04M 1/026; H04B 1/38; H04B 2001/3894
See application file for complete search history.

(56) References Cited

U.S. PATENT DOCUMENTS

2012/0314354 A1 12/2012 Rayner
2012/0328241 A1 12/2012 Shishkov et al.
(Continued)

FOREIGN PATENT DOCUMENTS

CN 102823069 12/2012
CN 104472009 3/2015
(Continued)

OTHER PUBLICATIONS

European Search Report in European Patent Application No. 18160987.6, dated Sep. 11, 2018, 12 pages.

*Primary Examiner* — Dong-Chang Shiue
(74) *Attorney, Agent, or Firm* — Fish & Richardson P.C.

(57) ABSTRACT

A mobile terminal includes: a case unit including a plurality of case parts; a waterproof member that waterproofs the plurality of case parts; an inner space formed by the plurality of case parts and the waterproof member; a sound output unit in the inner space; an electronic component in the inner space; at least one processor controlling the sound output unit; a resonance space in the inner space that resonates sound from the sound output unit; and a sound hole at one side of the case unit that outputs a first sound. A sound pressure level of a second sound output by vibration of the case unit due to the first sound is higher than that of the first sound in a low-frequency range, and when the case unit is on a mounting surface, a third sound is generated by the mounting surface due to vibration of the second sound.

20 Claims, 21 Drawing Sheets

Related U.S. Application Data

(60) Provisional application No. 62/561,690, filed on Sep. 22, 2017.

(51) Int. Cl.
*H04R 1/28* (2006.01)
*G06F 1/16* (2006.01)
*H04M 1/03* (2006.01)
*H04B 1/38* (2015.01)

(52) U.S. Cl.
CPC ........... *H04M 1/026* (2013.01); *H04M 1/035* (2013.01); *H04R 1/2811* (2013.01); *H04B 2001/3894* (2013.01); *H04R 1/2842* (2013.01); *H04R 2499/11* (2013.01)

(56) References Cited

U.S. PATENT DOCUMENTS

| | | | |
|---|---|---|---|
| 2013/0033401 A1* | 2/2013 | Kim | H04M 1/035 343/702 |
| 2014/0153763 A1 | 6/2014 | Dinh et al. | |
| 2014/0294217 A1* | 10/2014 | Yamaguchi | H04M 1/035 381/334 |
| 2017/0257148 A1 | 9/2017 | Choi | |
| 2018/0109658 A1* | 4/2018 | Le | H04M 1/03 |

FOREIGN PATENT DOCUMENTS

| | | |
|---|---|---|
| CN | 104540080 | 4/2015 |
| EP | 2613563 | 7/2013 |
| EP | 3160160 | 4/2017 |
| KR | 20130050045 B1 | 5/2013 |
| KR | 20130140492 A | 12/2013 |
| KR | 20140002170 B1 | 1/2014 |
| KR | 20140045117 B1 | 4/2014 |
| KR | 1609950 B1 | 4/2016 |
| KR | 20160041392 B1 | 4/2016 |
| KR | 20170006075 B1 | 1/2017 |
| KR | 20170059083 B1 | 5/2017 |
| KR | 1790528 B1 | 11/2017 |
| WO | WO2014050983 A1 | 8/2016 |

* cited by examiner 10 cc

B2

5 cc
B3

5 cc
B4

0.33 cc

B1

MOBILE TERMINAL

CROSS-REFERENCE TO RELATED APPLICATIONS

This application is a continuation of U.S. application Ser. No. 15/942,964, filed on Apr. 2, 2018, now allowed, which claims the benefit of an earlier filing date and right of priority to U.S. Provisional Application No. 62/561,690, filed on Sep. 22, 2017 and Korean Patent Application No. 10-2017-0167036, filed on Dec. 6, 2017, the contents of which are hereby incorporated by reference as if fully set forth herein.

TECHNICAL FIELD

The present disclosure relates to a mobile terminal that enhances the quality of low-frequency sound by expanding the resonance space of a sound output unit.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

For the multimedia function of the mobile terminal, not only technology related to images displayed on the screen but also the audio function is very important. A cable may be used to connect a mobile terminal to an external speaker to output sound through the external speaker, or the mobile terminal itself may be provided with a speaker to output sound.

SUMMARY

Implementations are disclosed herein that are directed to a mobile terminal configured to provide an increased resonance space for a sound output unit.

In some scenarios, a mobile terminal as disclosed herein may secure an increased resonance space of a sound output unit to improve the quality of sound output. In some scenarios, implementations may enable a mobile terminal configured to improve a sound output unit by utilizing not only a diaphragm of the sound output unit, but also by utilizing the body of the mobile terminal itself and/or by utilizing a mounting surface on which a mobile terminal is mounted.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one aspect, a mobile terminal includes: a case unit including a plurality of case parts defining an outer appearance; a waterproof member configured to waterproof a gap between the plurality of case parts; an inner space formed by coupling of the plurality of case parts with the waterproof member; a sound output unit mounted in the inner space; an electronic component mounted in the inner space; at least one processor configured to control the sound output unit; a resonance space provided in the inner space and configured to resonate sound that is output from the sound output unit; and a sound hole provided at one side of the case unit and configured to output a first sound. A sound pressure level of a second sound output by vibration of the case unit due to vibration of the first sound is higher than a sound pressure level of the first sound in a low-frequency sound range, and, in a state in which the case unit is placed on a mounting surface, a third sound is generated by the mounting surface due to vibration of the second sound.

In some implementations, the mobile terminal further includes: a vent hole that is formed in the case unit and configured to balance an air pressure between an outside and the inner space; and a mesh configured to restrict a liquid from passing therethrough and to allow a gas to pass therethrough, the mesh covering the vent hole.

In some implementations, the case unit is configured to, as an area of the case unit contacting the mounting surface increases, generate an increased sound pressure level of the third sound.

In some implementations, the mobile terminal further includes: a display unit mounted on a front surface of the case unit, wherein the case unit includes: a side case covering a lateral surface of the case unit; a rear case positioned on a rear surface of the case unit and having a flat surface; and a window positioned on the front surface to cover the display unit. The waterproof member includes a waterproof ring or a waterproof tape positioned between the side case and the rear case, and, in a first state in which the rear case contacts the mounting surface, the sound pressure level of the third sound is higher than in a second state in which the window contacts the mounting surface.

In some implementations, the rear case includes a glass material.

In some implementations, the at least one processor is further configured to: in a state in which sound is output through the sound output unit, control the display unit to output a message indicating that the rear surface of the case unit should be arranging to face the mounting surface.

In some implementations, the at least one processor is further configured to: control the display unit to output a menu for inputting a user command to restrict vibration of the case unit or restrict the second sound; and based on the user command being input, lower an output voltage of the sound output unit at a resonant frequency of the third sound.

In some implementations, the resonance space is configured to be in contact with the rear case.

In some implementations, the low-frequency sound range is below 1000 Hz.

In some implementations, the at least one processor is further configured to adjust an output voltage of the sound output unit to a lower value in a sound range below 300 Hz.

In some implementations, the sound output unit includes: a diaphragm positioned on one surface; a voice coil positioned on a rear surface of the diaphragm; a ring magnet positioned outside the voice coil; a frame configured to expose the diaphragm and to cover a lateral surface and a rear surface of the magnet and the voice coil; and a resonance hole formed in a lateral direction of the frame.

In some implementations, the frame includes: a side frame positioned around a lateral surface of the sound output unit and including a depressed groove on an opposite surface of the sound output unit; and a yoke plate coupled to an opposite surface of the side frame. The resonance hole is defined as an opening between the groove and the yoke plate.

In some implementations, the resonance hole is defined at a corner of the sound output unit, and the ring magnet includes a plurality of unit magnets spaced apart from the corner.

In some implementations, the mobile terminal further includes: a sound bracket including a sound passage covering one surface of the sound output unit and extending between the sound hole and the diaphragm, the sound bracket exposing the opposite surface of the sound output unit to the resonance space.

In some implementations, the diaphragm includes: a first diaphragm position at a center; and a second diaphragm positioned at a periphery. A thickness of the first diaphragm is between 200 μm and 300 μm, and a thickness of the second diaphragm is between 50 μm and 70 μm.

In some implementations, the mobile terminal further includes: a microphone configured to detect sound; and a soundproof member surrounding a periphery of the microphone.

In some implementations, the mobile terminal further includes a battery mounted in the inner space. The resonance space includes: a first resonance space positioned below the battery; a second resonance space connected to the first resonance space and positioned on a lateral surface of the battery; and a third resonance space connected to the second resonance space and positioned over an upper surface of the battery.

In some implementations, the sound output unit includes a first sound output unit and a second sound output unit. In a call mode, the mobile terminal is configured to output sound at a first output power through the first sound output unit. In a mono speaker mode, the mobile terminal is configured to output sound through the second sound output unit. In a stereo speaker mode, the mobile terminal is configured to output sound through the second sound output unit and simultaneously output at a sound output power greater than the first output power through the first sound output unit.

In some implementations, the sound output unit includes the first sound output unit and the second sound output unit, and the resonance space is divided into a fourth resonance space connected to the first sound output unit and a fifth resonance space connected to the second sound output unit.

In some implementations, the case unit includes the plurality of case parts, and the waterproof member includes a waterproof tape, a waterproof adhesive, resin, rubber, or a waterproof ring disposed between the plurality of case parts.

In some implementations, the mobile terminal further includes: a camera including a camera glass configured to cover a camera hole formed in the rear surface of the case unit. The camera glass is arranged in the same plane as the rear surface of the case unit.

In some implementations, the resonance space is configured to have a spatial volume of at least 8 cc.

In another aspect, a mobile terminal includes: an outer case assembly including a display portion and a rear cover, the outer case assembly including at least one vent hole and at least one sound hole, the outer case assembly defining an inner space that is sealed to be waterproof; an electronic assembly mounted in the inner space of the outer case assembly; a speaker configured to output sound from the at least one sound hole of the outer case, the speaker including a diaphragm; and a bracket that is mounted on a first side of the speaker and that is configured to direct sound that is output from the first side of the speaker towards an outside of the mobile terminal. The bracket and the diaphragm define a first spatial volume in which sound emitted from a first side of the diaphragm resonates. The diaphragm and the inner space of the outer case assembly define a second spatial volume in which sound emitted from a second side of the diaphragm resonates.

In another aspect, a mobile terminal includes: an outer case assembly including a display portion and a rear cover, the outer case assembly including at least one vent hole and at least one sound hole and defining an inner space that is sealed to be waterproof; an electronic component assembly mounted in the inner space; a speaker configured to output sound from the at least one sound hole of the outer case; and a bracket that is mounted on the speaker and configured to define a front spatial volume of the speaker. The speaker and the outer case assembly are configured to define a back spatial volume of the speaker.

In another aspect, a mobile terminal includes: an outer case assembly including a display portion and a rear cover, the outer case assembly including at least one vent hole and at least one sound hole and defining an inner space that is sealed to be waterproof; an electronic assembly mounted in the inner space of the outer case assembly; and a speaker configured to output sound from the at least one sound hole of the outer case, the speaker including a diaphragm. The speaker and the inner space of the outer case assembly are configured to create a resonance frequency that substantially corresponds to an entire spatial volume of the inner space of the outer case assembly.

Further scope of applicability of the present disclosure will become apparent from the following detailed description. It should be understood, however, that the detailed description and specific implementations, such as the preferred implementation of the disclosure, are given by way of example only, since various changes and modifications can be made within the spirit and scope of the disclosure.

DETAILED DESCRIPTION

Figure 1A:
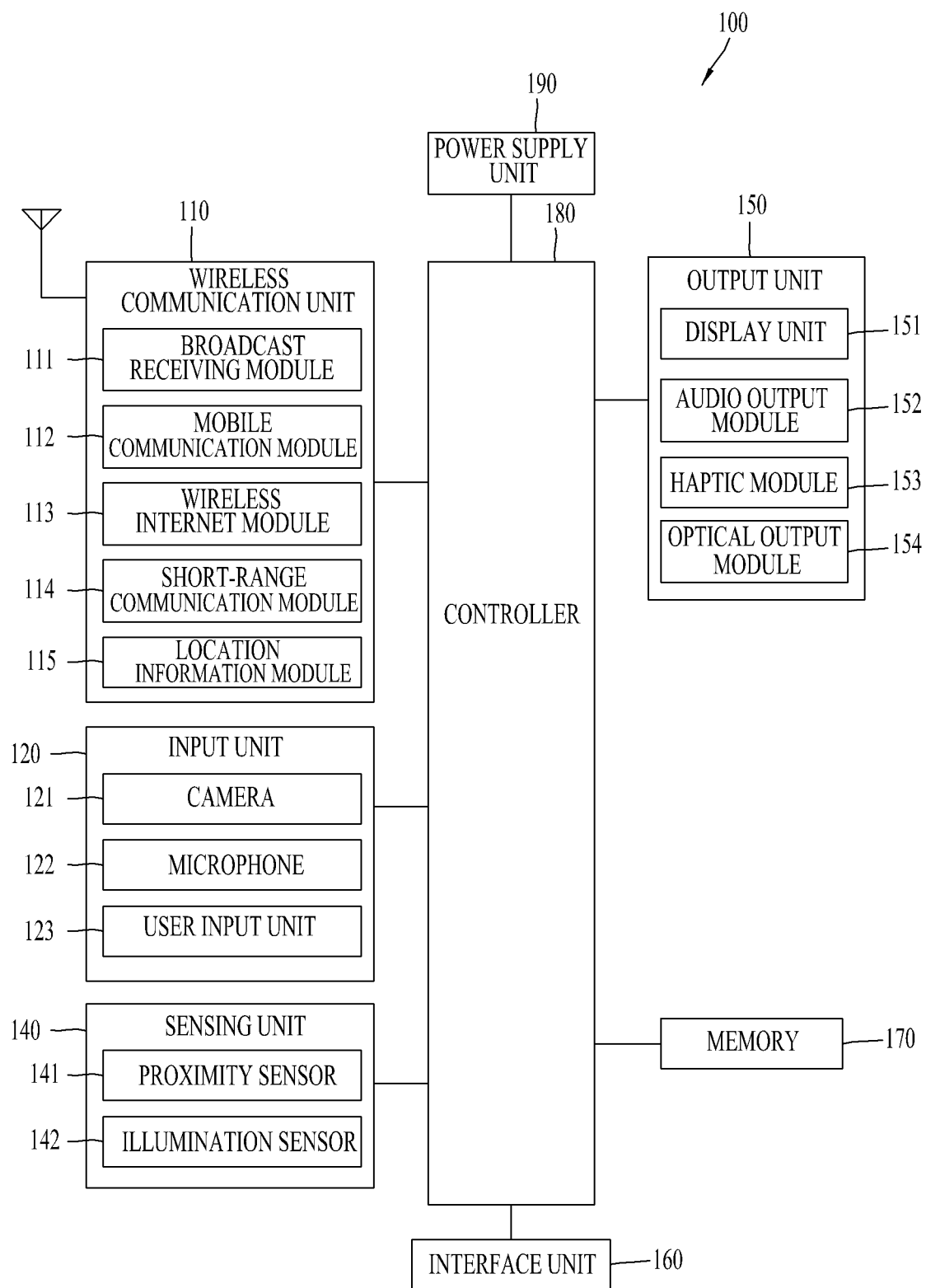
FIG. 1A is a block diagram of an example of a mobile terminal in accordance with the present disclosure.

A mobile device may include a sound output device that implements a resonance space to amplify the output of sound. The shape and size of the resonance space in the sound output device may affect sound quality of the mobile device.

Implementations disclosed herein provide a mobile terminal that implements a resonance space of a sound output unit that improves the quality of sound output from the sound output unit. As such, the mobile terminal according to present disclosure may be able to overcome a weak point as compared to alternative designs of a sound output unit by utilizing not only a diaphragm of the sound output unit, but also the mobile terminal itself and/or a mounting surface on which a mobile terminal is mounted.

Description will now be given in detail according to exemplary implementations disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
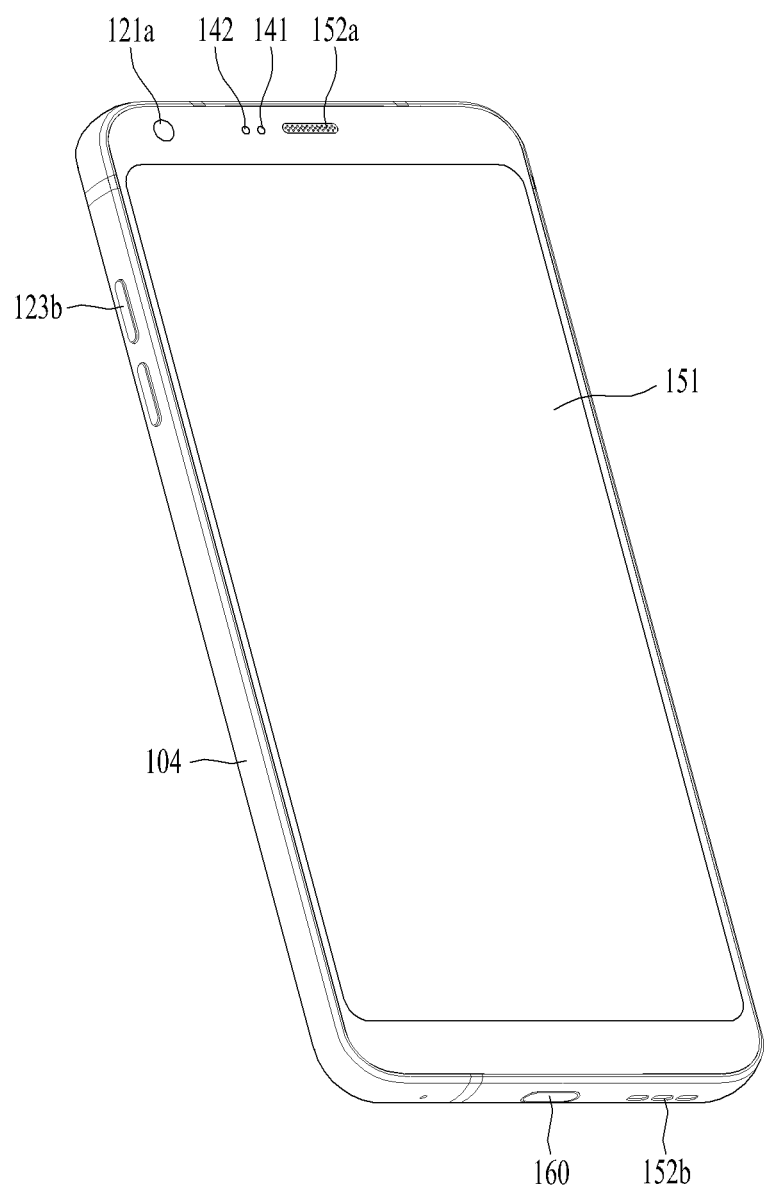
FIGS. 1B and 1C are diagrams illustrating examples of the mobile terminal, viewed from different directions.
Figure 1C:
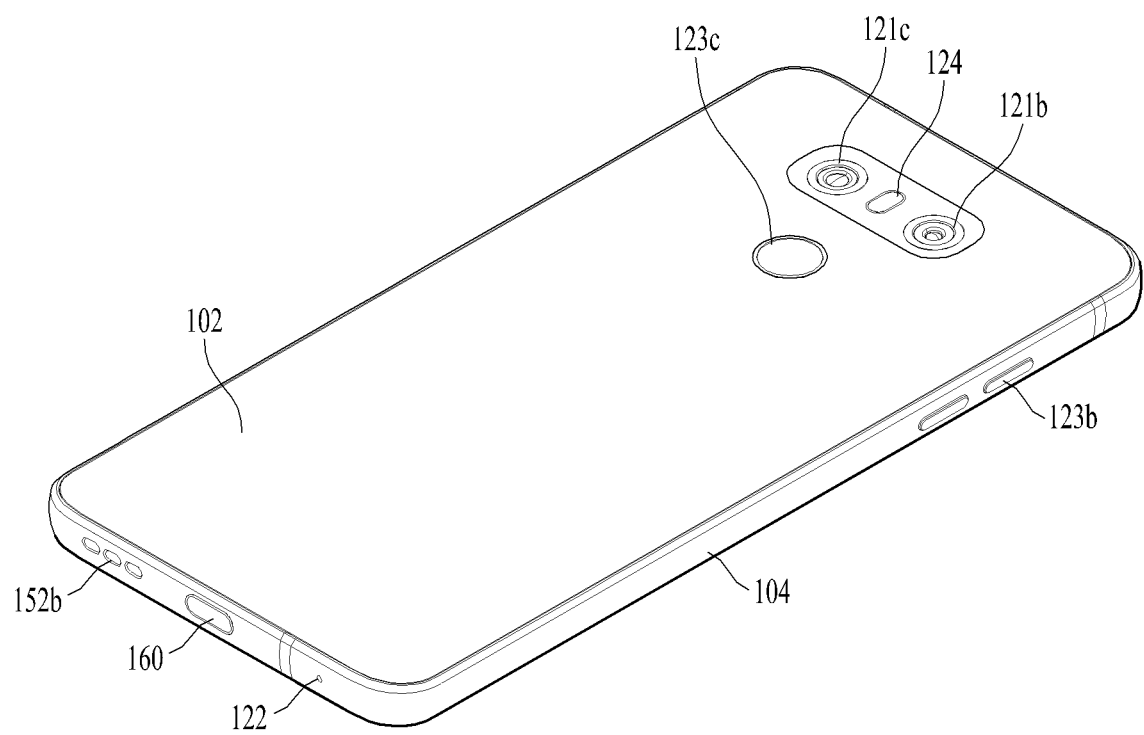

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, at least one processor such as controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by at least one processor such as controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some scenarios, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the scenarios for basic functions of the mobile terminal 100 (for example, receiving a call, placing a call, receiving a message, sending a message, and the like). It is common for application programs to be stored in the memory 170, installed in the mobile terminal 100, and executed by at least one processor such as controller 180 to perform an operation (or function) for the mobile terminal 100.

The at least one processor, such as controller 180, typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170. The controller 180 may be implemented by one or more processors, which may be distributed.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with implementations of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal 100 to at least one of the aggregate.

The mobile terminal 100 includes a housing (for example, a housing, a window, etc.), which defines the outer appearance of the mobile terminal 100. In some mobile devices, the front and rear surfaces of the mobile terminal 100 may be formed using a front case and a rear case, and electronic components may be mounted in the inner space between the front case and the rear case. However, in such mobile devices, there may also be a goal of increasing the size of the display unit 151. Thus, the display unit 151 occupies a substantial portion of the front surface, and a window 151a protecting the front surface of the display unit 151 is enlarged to cover the entire front surface of the display unit 151. In this configuration, the periphery of the rear case 102 may protrude forward so as to cover the lateral surface of the mobile terminal 100.

In some implementations, the front case may be omitted. Instead, a middle frame 105 for reinforcing the mobile terminal 100 while supporting the rear surface of the display unit 151 may be provided, and thus the housing of the mobile terminal 100 may be configured by mounting electronic components on the rear surface of the middle frame 105 and coupling the rear case to the rear surface.

In some implementations, a side case 104 may be separately provided to cover the lateral surface of the mobile terminal 100. The side case 104 may be integrated with the middle frame 105 described above. For example, a portion of the periphery of the middle frame 105 that is exposed to the outside may be the side case 104. When the side case 104 includes a metal material, the side case 104 may function as a part of the antenna, and the rear case 102 may be made of a material different from that of the side case 104. A design employing metal or glass for the rear case 102 may be adopted by implementations described herein.

As described above, the housing that defines the outer appearance of the mobile terminal 100 includes a plurality of case parts, such as rear case 102 and side case 104, and a window 151a. Water may infiltrate the mobile terminal 100 through gaps between the cases 102 and 104 and the window 151a. A waterproof tape, a waterproof adhesive, or a waterproof ring 108 made of resin, rubber or an elastic material may be used to shield the gaps between the cases 102 and 104 and the window 151a of the mobile terminal 100 to prevent water from infiltrating the inner space in which components are mounted. As the functions of the mobile terminal 100 are diversified, the waterproof function is becoming essential because the mobile terminal 100 is used even in a swimming pool or on a rainy day.

In some implementations, the display unit 151, a first sound output unit 152a, a proximity sensor 141, an illuminance sensor 142, an optical output unit 154, a first camera 121a, and a front input unit may be disposed on the front surface of the mobile terminal 100. In some implementations, some of the components may be omitted or disposed on other portions, which may help increase the size of the display unit 151.

Hereinafter, an example of the mobile terminal 100 having a side input unit 123b, a microphone 122, a second sound output unit 152b, and an interface unit 160 disposed on the lateral surface thereof and also having a second camera 121b and a rear input unit 123c disposed on the rear surface of the terminal body will be described. However, implementations are not limited thereto. The side input unit 123b, the microphone 122, the second sound output unit 152b and the interface unit 160 may be omitted or disposed on the rear surface or front surface of the mobile terminal 100.

The display unit 151 displays (outputs) information processed by the mobile terminal 100. For example, the display unit 151 may display execution screen information of an application program executed by the mobile terminal 100 or user interface (UI) or graphical user interface (GUI) information according to the execution screen information.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

Various kinds of content may be set to be input through the front input unit 123a and the side input unit 123b. For example, the front input unit may receive commands corresponding to a menu, a home key, cancel, search, and the like. The side input unit 123b may control the acoustic volume of sound output from the first or second sound output units 152a, 152b, and receive an input command for switch to a touch recognition mode of the touch panel 151 or the like.

As another example of the user input unit 123, a rear input unit 123c may be located on the rear surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control an acoustic volume level being output from the first or second audio output modules 152a or 152b, switch to a touch recognition mode of the display unit 151, and the like. The rear input unit 123c may be configured to permit touch input, a push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at most any location of the rear side of the terminal body.

Embodiments that include the rear input unit 123c may implement some or all of the functionality of the front manipulation unit 123a in the rear input unit. As such, in situations where the front manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Further preferred implementations will be described in more detail with reference to additional drawing figures. It is understood by those skilled in the art that the present features can be embodied in several forms without departing from the characteristics thereof.

Figure 2:
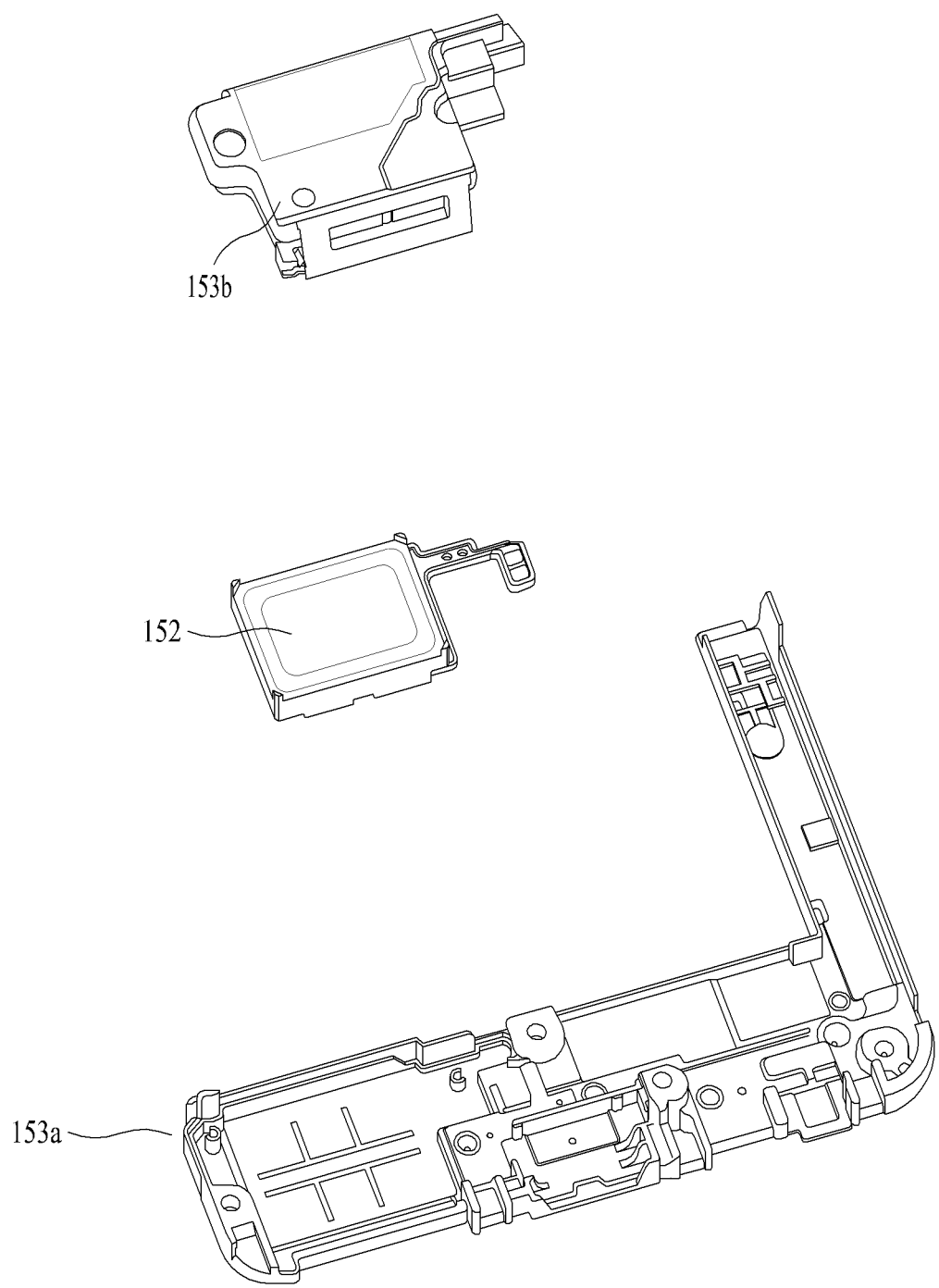
FIG. 2 is a view showing an example of a sound output unit and sound brackets of a mobile terminal according to an alternative design scenario.
Figure 3:
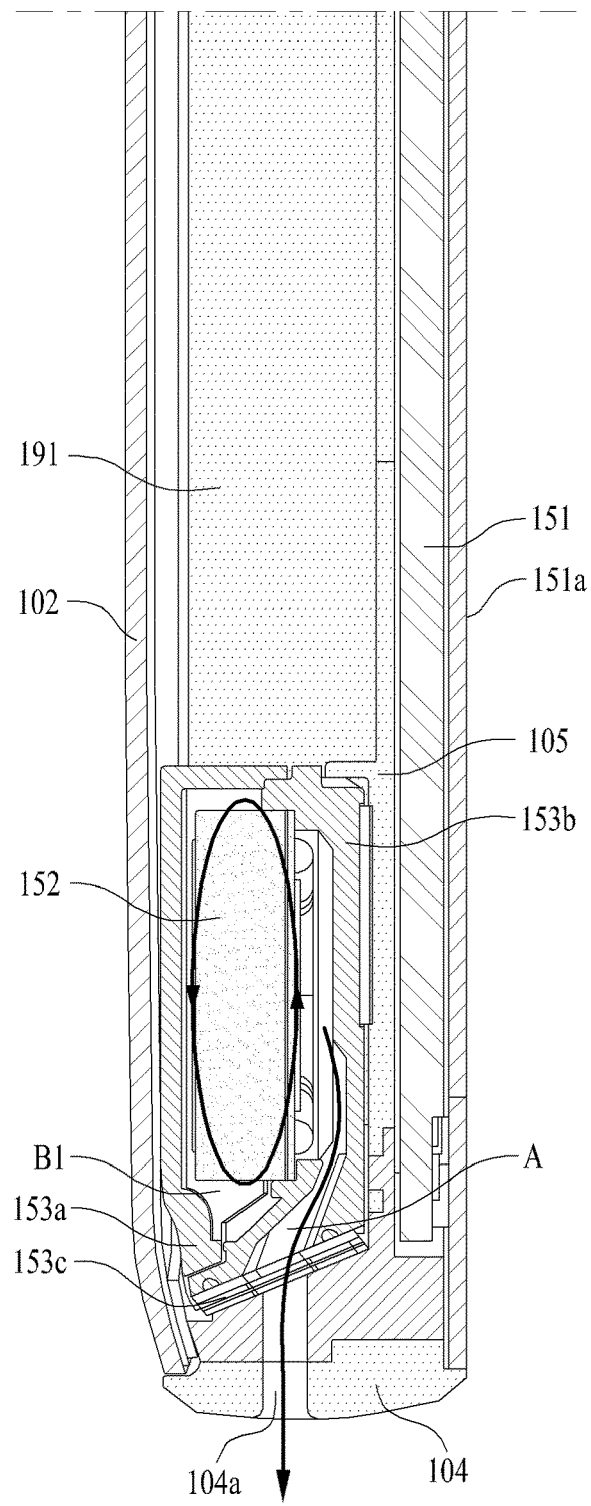
FIG. 3 is an example of a cross-sectional view taken along line C-C of FIG. 2 for a mobile terminal according to the alternative design scenario.

FIG. 2 is a view showing a sound output unit 152 and sound brackets 153a and 153b of an alternative mobile terminal design. FIG. 3 is a cross-sectional view showing the sound output unit 152 of the alternative mobile terminal design. The sound output unit 152 has a magnet and a voice coil, which are mounted in a space surrounded by a side frame, a diaphragm positioned on a first surface, and a yoke plate positioned on the second surface When power is supplied to the voice coil, the voice coil is moved by the magnetic field formed by the magnets located around the voice coil. The diaphragm vibrates according to movement of the voice coil and outputs sound. The sound spreading toward the first surface may be output to the outside through a sound hole 104a formed in the case, and the sound spreading toward the second surface may be amplified in a closed space (resonance space B1) and then output through the sound hole 104a.

In an alternative mobile terminal design, the sound output unit (e.g., sound output unit 152) is mounted in the sound brackets 153a and 153b covering both the one surface and the opposite surface of the sound output unit 152. Therefore, in the alternative mobile terminal design, the sound brackets 153a and 153b form the resonance space B1 which is a shielded space and resonant sound is output from the resonance space B1.

As shown in FIG. 3, in an alternative mobile design scenario, the sound brackets 153a and 153b include a first sound bracket 153a, 153b forming a sound passage A extending from the front surface where the diaphragm of the sound output unit 152 is located to the sound hole 104a formed in the case 104, and a second bracket 153a, 153b forming the resonance space B1 by covering the opposite surface of the sound output unit 152. In such alternative mobile terminal designs, the sound passage A is highly related to high-pitched sound (a high frequency band higher than or equal to 2 kHz) and the resonance space B1 is highly related to low-pitched sound (a low frequency band lower than or equal to 1 kHz).

The sound passage A may serve to guide a sound output direction to be changed when the sound output unit 152 and the sound hole 104a through which the sound is output are oriented in different directions, and may have a tapered shape whose cross-sectional area increases as the sound passage extends toward the sound hole 104a. As the size of the resonance space B1 surrounded by the sound brackets 153a and 153b increases, sound in a lower frequency band may be amplified. However, in such alternative mobile terminal designs, there is a limit in increasing the size of the resonance space B1 for the sound output unit 152, which has a small size and is mounted in the mobile terminal 100, and thus the sound quality may be lowered in a low frequency band.

In such alternative mobile terminal designs, mobile terminals are typically larger, and thus the size of the mobile brackets (e.g., mobile brackets 153a and 153b) were around 0.8 to 1 cc, and not restricted. By contrast, according to implementations described in the present disclosure enable a mobile terminal 100 with decreased size, and thus the spatial volume of the resonance space B1 inside the sound brackets 153a and 153b is reduced, for example to about 0.3 cc or less.

Figure 4:
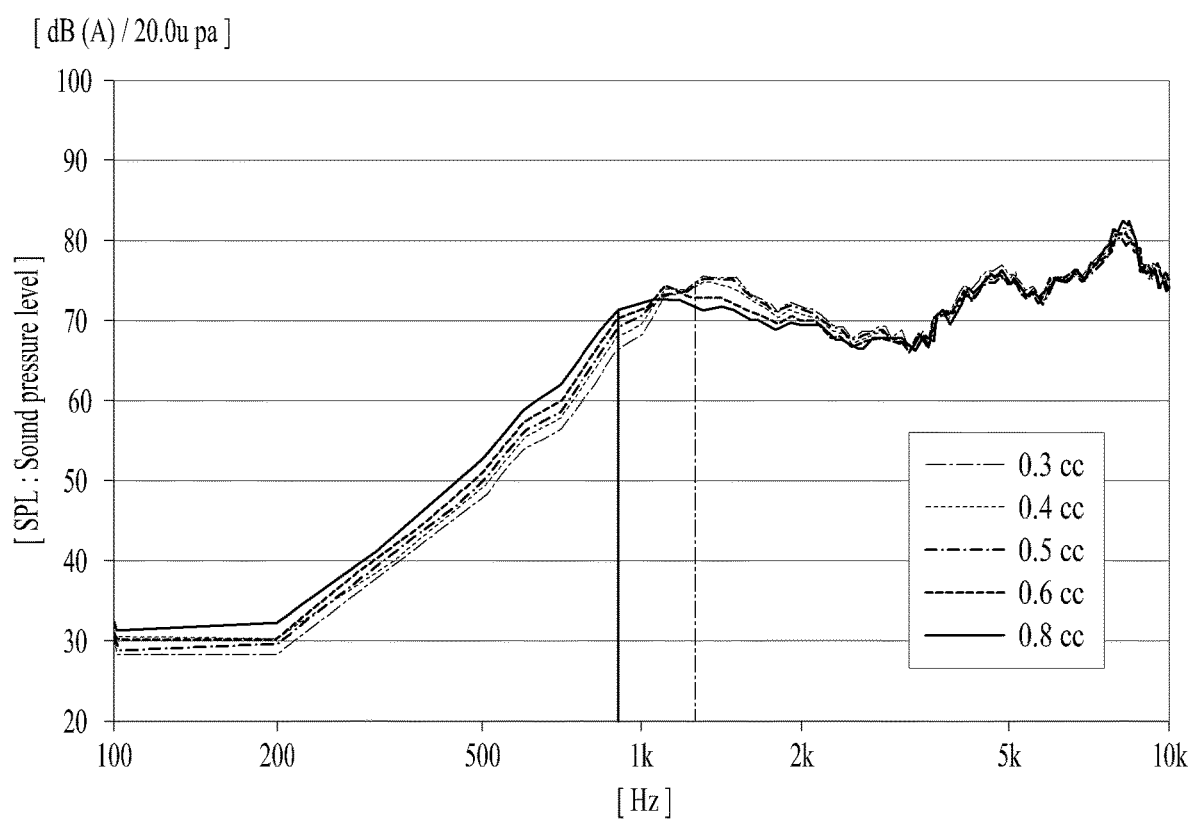
FIG. 4 is a graph depicting an example of a sound pressure level of output sound according to the spatial volume of a resonance space.

FIG. 4 is a graph depicting sound pressure levels of output sound according to the spatial volume of a resonance space. This graph shows the average sound pressure levels, expressed in decibel (dB), at 1 m above the reference axis when 0.5 W input is applied at a specified band frequency. If the experimental values are changed, the shape of the graph may also be changed.

The horizontal axis represents the frequency of sound. As a point is shifted to the right along the horizontal axis, the frequency of sound increases. In some implementations, low-pitched sound (low frequency band) may refer to sound of 1 kHz or less. The vertical axis represents the sound pressure level (SPL). As SPL rises, a sufficient acoustic volume of sound may be output. Referring to FIG. 4, the SPL suddenly drops at a low frequency (below 1 kHz). The SPL fluctuates at a high frequency (above 2 kHz).

Since high-frequency sound has a short wavelength, it is affected by the surrounding structure. Accordingly, the high-frequency sound exhibits a different SPL depending on the shape of the sound passage A including the size, length, and bent direction of the sound passage A. If the sound passage A is straight and short and thus does not interfere with output of high-frequency sound, the high-frequency sound may be output at a constant SPL. However, when the sound passage A is bent or long, the SPL of sound in the high-frequency band may change as shown in FIG. 4.

When the SPL is lowered, the acoustic volume of the sound heard by the user becomes smaller, and thus the sound of an SPL in a lower range is not clearly audible. Therefore, when the SPL of low-pitched sound is raised as high as possible, the audible frequency range of sound output from the sound output unit 152 may be widened.

Since the sound output unit 152 mounted on the mobile terminal 100 is small, the SPL is lowered as the sound range is lowered. The SPL going down as the sound range is lowered rises at a point around 1000 Hz on the graph. This point represents a frequency corresponding to the resonant frequency.

A phenomenon in which the amplitude of vibration of a diaphragm suddenly increases at a specific frequency is called resonance, and the specific frequency at which a high amplitude is obtained is called a resonant frequency f. At the resonant frequency, the SPL rises since the diaphragm has the maximum amplitude.

Figure 18:
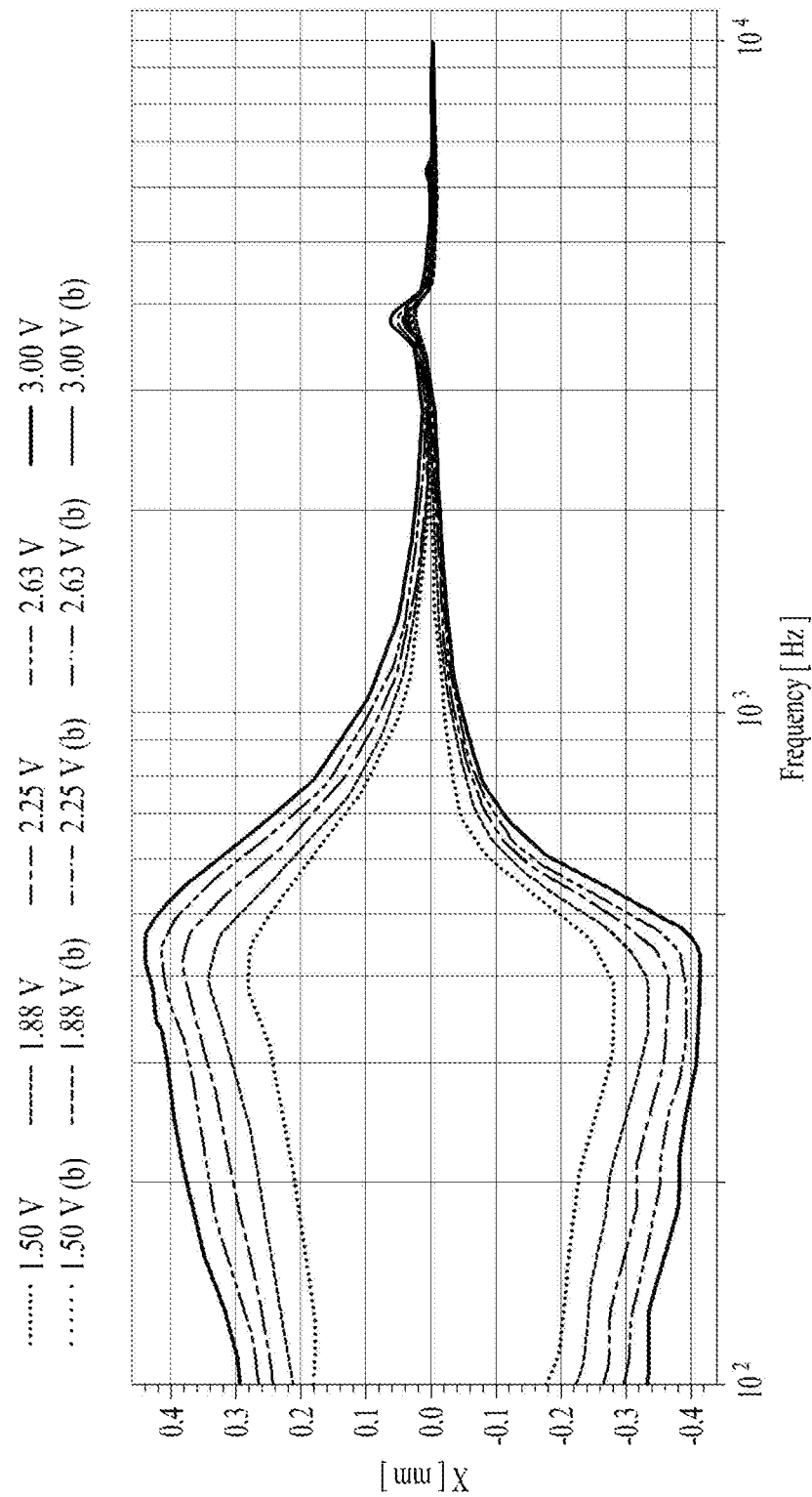
FIG. 18 is a graph depicting an example of the amplitude of vibration generated by a sound output unit of the present disclosure.

The resonant frequency is influenced by the impedance (resistance) of the voice coil constituting the sound output unit 152, and the point having the maximum impedance value on an impedance curve represents a resonant frequency (see FIG. 18, which shows the impedance and amplitude according to frequency). When the sound output unit 152 is driven, the coil around the magnet moves up and down by the applied electromotive force. Then, counter electromotive force is generated in the voice coil. When the voice coil moves in the first direction due to the current applied to the voice coil, change in the magnetic field caused by movement of the voice coil creates another flow of current.

The change in the magnetic field induces current flow in the voice coil, canceling a portion of the originally flowing current. Although the voltage is applied by the counter electromotive force, the amount of current is relatively reduced. Therefore, the resistance of the voice coil becomes large, resulting in increase in the impedance of the voice coil. In other words, the maximum impedance will be obtained at the resonant frequency at which movement of the diaphragm becomes large, and the maximum counter electromotive force is obtained. The resonant frequency is related to the size of the resonance space. If the resonance space is small, then the pressure in the resonance space may increase and thus vibration of the diaphragm is restricted from becoming large. On the other hand, if the resonance space is large, the pressure in the resonance space is low, and thus vibration of the diaphragm becomes large. Since the resonant frequency becomes lower as the elasticity (pressure) of the air in the resonance space becomes lower, a larger resonance space is typically required for a lower resonant frequency.

When the spatial volume of the resonance space is 0.3 cc, the resonant frequency is about 1200 Hz. When the spatial volume of the resonance space is 0.8 cc, the resonant frequency is lowered to about 1 kHz or less, and thus the SPL of low-pitched sound is raised overall. At the frequency of 500 Hz, the SPL of sound output from a resonance space with a spatial volume of 0.8 cc is higher than that of sound output from a resonance space with a spatial volume of 0.3 cc by about 5 dB or more. That is, as the spatial volume of the resonance space is increased, the resonant frequency of the output sound may be decreased, and sound of a low frequency band may be sufficiently obtained. Since the SPL of low-pitched sound is improved as the resonant frequency is lowered, the quality of bass of the second sound may be improved as the resonant frequency is lowered. Ultimately, the quality of sound output from the mobile terminal may be improved.

Figure 5:
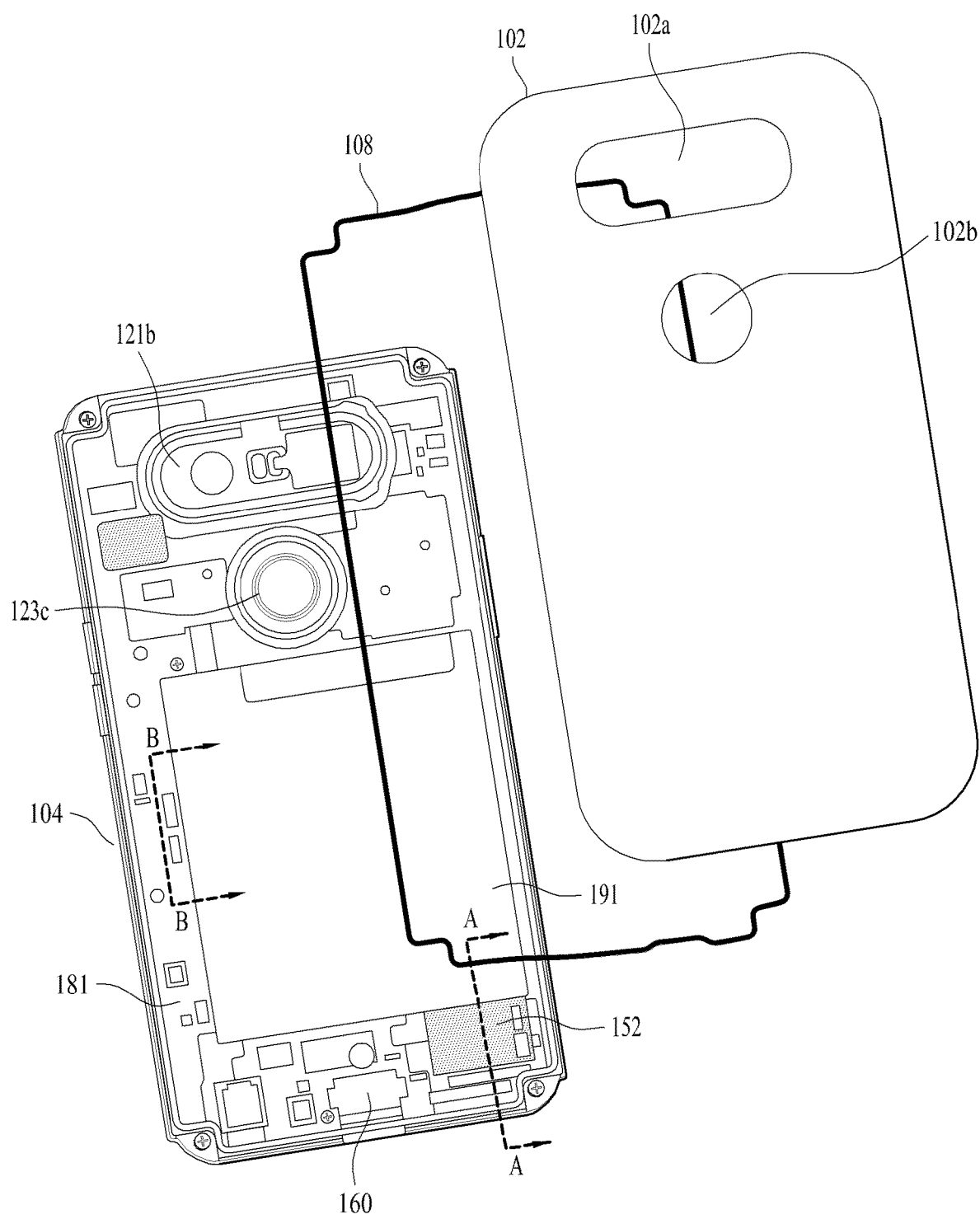
FIG. 5 is a rear view showing an example of a mobile terminal and a rear case separated therefrom according to implementations of the present disclosure.

FIG. 5 is a rear view showing an example of the mobile terminal 100 and a rear case 102 separated therefrom according to implementations of the present disclosure. The mobile terminal 100 of the present disclosure may include a side case 104 and the rear case 102, and a waterproof ring 108 may be placed in the gap between the side case 104 and the rear case 102 to prevent water from infiltrating the inner space.

As described above, the side case 104 may be omitted and the lateral surface of the mobile terminal 100 may be configured by extending the rear case 102. The rear case 102 may be provided with openings 102*a* and 102*b* for a camera 121*b* and a rear button 123*c*. To prevent water from infiltrating the openings 102*a* and 102*b*, a waterproof tape, a waterproof adhesive, resin, rubber or the waterproof ring 108 may be provided around the openings 102*a* and 102*b*. The waterproof structure is not limited thereto and may be implemented using a member capable of preventing infiltration of water into the interior.

When the temperature or the air pressure changes, the air expands or shrinks. In order to counterbalance this change, a passage through which the air can flow into the inner space may be implemented to counterbalance the change in temperature or pressure. The shape of the mobile terminal may be changed or the diaphragm of the sound output unit 152 may be damaged due to a difference between the atmospheric pressure of the inner space of the mobile terminal and the external atmospheric pressure caused by variation of the atmospheric pressure according to altitude. In order to compensate for such a difference in air pressure, a vent hole that allows a gas to pass therethrough but does not allow a liquid to pass therethrough may be formed around the openings 102*a* and 102*b* of the rear case 102. That is, the vent hole includes a mesh having fine holes of a small size (several hundred times smaller than a raindrop, which is about 1 mm) such as Gore-Tex.

Gore-Tex is a film-like member formed using a laminating technique of closely attaching a hydrophobic film to a hydrophilic film. Gore-Tex is configured such that the inside of the Gore-Tex is hydrophilic and the outside is hydrophobic. Thus, Gore-Tex shields the inner space by allowing air to pass therethrough and prevents moisture from infiltrating into the inner space. Here, the shielding does not necessarily require that the airflow is completely blocked by sealing, but may include scenarios where the airflow is restricted in a manner that the airflow is partially allowed.

The vent hole may be formed not only in the lateral surface or rear surface but also between the window 151*a* and the cases. The vent hole may be formed using the existing gaps or openings. For example, the vent hole may be formed by using the openings 102*a* and 102*b* formed in the rear case 102. That is, a waterproof member interposed between the rear case 102 and the camera 121*b* or the rear button 123*c* is partially omitted, and a mesh allowing gas to pass therethrough and not allowing a liquid to pass therethrough may be interposed in the openings 102a and 102b using a waterproof tape to implement the vent hole.

In some implementations, since the vent hole is very small and is open only to one side, it is difficult for air to flow in and out through the vent hole at the same time. As air can pass through the vent hole only when the spatial volume of air in the inner space changes due to expansion or contraction of the air in the inner space, the housing of the mobile terminal 100 may be prevented from being expanded in a hot environment or being indented in a cold area.

The battery 191 occupies the biggest part of the inner space of the mobile terminal 100, and the camera 121 and the user input unit 123 are disposed in an upper portion of the inner space.

The interface unit 160 and the second sound output unit 152b may be disposed in a lower portion of the mobile terminal 100. The components may be mounted in the inner space by dividing the inner space into the upper portion and the lower portion with respect to the battery 191, and a signal passage for connecting the components positioned in the upper and lower portions may be arranged next to the battery 191 by disposing the battery 191 on the left or right side in the inner space.

Various components including a printed circuit board 181 are mounted in the inner space. Since the electronic components have different thicknesses and are spaced apart from each other by a predetermined distance, the inner space is provided with an empty space when the electronic components are mounted in the inner space.

The sound output unit 152 is a device for outputting sound by vibrating a diaphragm using a magnet and a coil. When current is supplied to the coil, a magnetic field is created, and attractive force or repulsive force is generated between the coil and the magnet, thereby vibrating the diaphragm.

Figure 6:
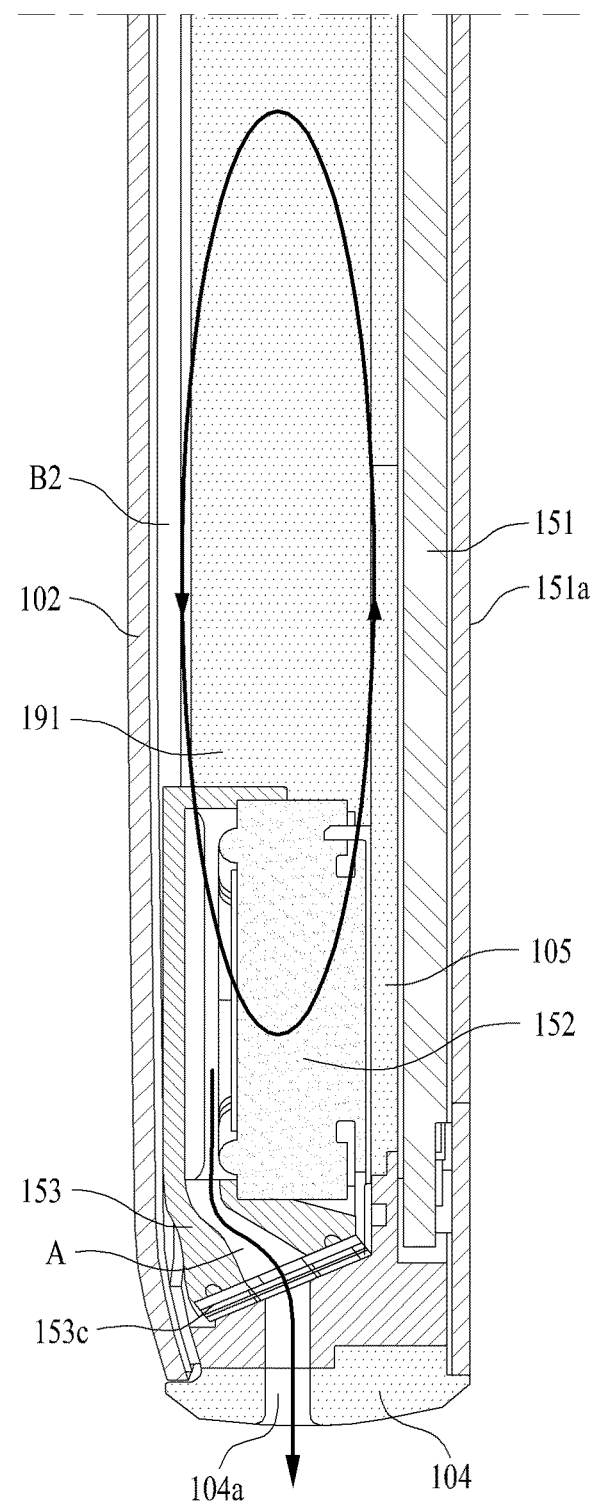
FIG. 6 is an example of a cross-sectional view taken along line A-A of FIG. 5.

The diaphragm of the sound output unit 152 may include a sound passage A connected between the sound holes 104a that output sound and are formed in the front portion of the sound output unit 152 and the housing (see FIG. 6).

Figure 7:
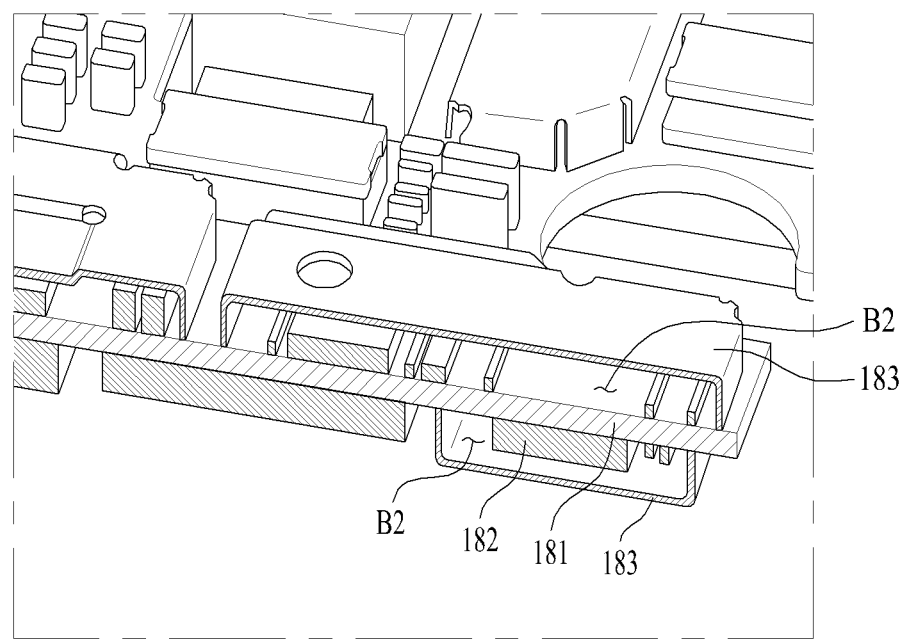
FIG. 7 is an example of a cross-sectional view taken along line B-B of FIG. 5.

FIGS. 6 and 7 are cross-sectional views of the mobile terminal 100 of the present disclosure. FIG. 6 is a cross-sectional view taken along line A-A of FIG. 5, and FIG. 7 is a cross-sectional view taken along line B-B of FIG. 5. As shown in FIG. 6, the sound bracket 153 of the present disclosure covers only one surface of the sound output unit 152, on which the diaphragm is formed and exposes the opposite surface of the sound output unit 152, unlike the alternative design of sound brackets 153a and 153b.

As such, the mobile terminal according to implementations of the present disclosure mitigates the need for the second bracket 153b that forms the resonance space B1 in the alternative design scenario. Since the sound bracket 153 typically occupies a certain spatial volume of the inner space, implementations disclosed herein create an additional space that is as large as the space occupied by the second sound bracket 153b (FIG. 3), and also reduces the number of components in the mobile device.

In the present disclosure, the inner space of the cases of the mobile terminal 100 is used as a resonance space B2. In some alternative design scenarios, a mobile terminal is not waterproof and thus a separate resonance space B2 is formed using the sound brackets 153a and 153b. However, in the mobile terminal 100 according to implementations disclosed herein, a waterproof member forms an inner space into which external air cannot easily flow, and thus a spare space formed in the inner space when electronic components are mounted in the inner space may be used as a resonance space B2. The structure of the sound output unit of the present disclosure, which does not utilize a resonance space blocked by sound brackets, is referred to herein a module-less structure.

As shown in FIG. 7, electronic components are mounted in the inner space. Since the electronic components have thicknesses and are spaced apart from each other, an empty space is formed. For example, an integrated circuit (IC) 182 or a shield can 183 for protecting the IC 182 is mounted on a printed circuit board 181, and an empty space formed around the IC 182 and between the IC 182 and the shield can 183 may be formed and thus be used as the resonance space B2.

Figure 8A:
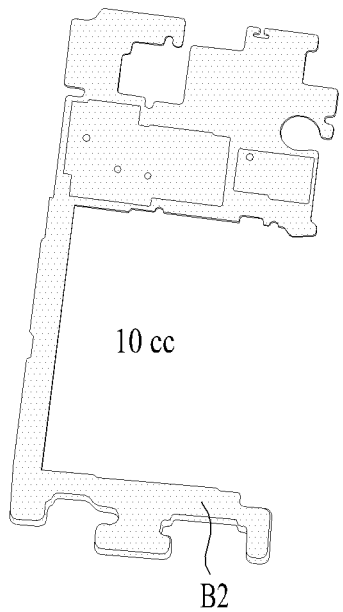
FIGS. 8A-8C are examples of views comparing the mobile terminal of the present disclosure versus an alternative mobile terminal design, in terms of the size of a resonance space.
Figure 8B:
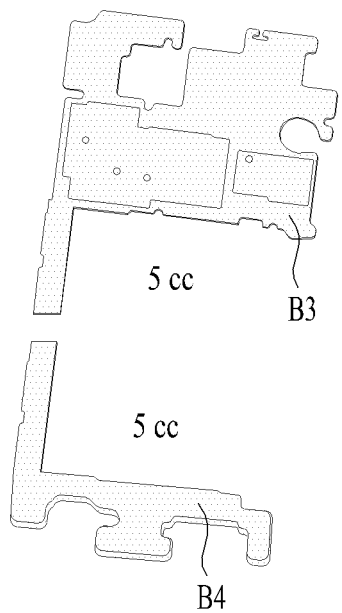
Figure 8C:
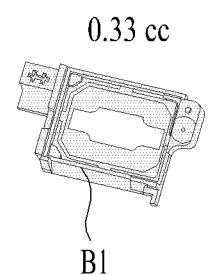

FIGS. 8A-8C illustrate examples of showing a resonance space for the sound output unit 152 of a mobile terminal according to implementations of the present disclosure as compared with alternative mobile terminal designs. FIG. 8A shows a spare space formed when the battery 191, the sound output unit 152, the cameras 121a and 121b, and the printed circuit board 181 are mounted in the inner space of the mobile terminal 100 of the present disclosure.

In the present disclosure, in order to utilize the empty part of the inner space as the resonance space B2, the inner space may be formed as a single communicating space. However, since the battery 191 does not have a concavo-convex structure, it does not actually provide a spare space. Therefore, a partition may be formed only on the battery 191 to form a separate space. The resonance space may be divided into a first resonance space located below the battery 191, a second resonance space located on the side of the battery 191, and a second resonance space located above the battery 191, except for a portion where the battery 191 is mounted.

In the mobile terminal 100 of the present disclosure, a spare space in the inner space may be used as the resonance space B2, and may secure a spatial volume of about 8 cc or more. The resonance space B2, whose size varies when the design and size of the mobile terminal 100 are changed, is larger than the resonance space B1 (see FIG. 3) surrounded by the sound brackets. The size of the resonance space B2 may be increased or decreased according to the sizes, arrangement, and the like of the electronic components inside the mobile terminal 100. Hereinafter, for simplicity, a mobile terminal 100 having a resonance space B2 of about 10 cc will be described.

FIG. 8C shows an example of the resonance space B1 formed by an alternative design scenario of the sound brackets 153a and 153b (FIG. 4), in which the spatial volume of the resonance space B1 is only about 0.3 cc. By contrast, the resonance space B2 of the mobile terminal 100 according to implementations of the present disclosure is about 20 to 30 times larger than the resonance space B1 in the alternative mobile terminal design. As described with reference to FIG. 4, since the SPL of low-pitched sound increases as the resonance space is enlarged, the second sound converted in the resonance space B2 of the present disclosure has a lower SPL in the low-pitched sound range than the second sound converted in the resonance space B1 of the alternative design.

For the resonance space B2, both the sound output units 152a and 152b may be used for the resonance space at the same time. If necessary, the inner space may be provided with a divisional structure such as a partition and thus be divided into a fourth resonance space B3 and a fifth resonance space B4. As shown in FIG. 8B, the fourth resonance space B3 may be used as a resonance space of the first sound output unit 152a and the fifth resonance space B4 may be used as a resonance space of the second sound output unit 152b. As such, according to implementations of the present disclosure, the size of the resonance space usable by one sound output unit 152a or 152b may be reduced, but a resonance space that is larger than the resonance space B1 of alternative designs may be secured. In addition, when the pair of sound output units 152a and 152b is used, interference may be reduced or avoided.

When both sound output units 152a and 152b secure sufficient resonance spaces, the sound output from the first sound output unit 152a may be amplified in the resonance space and thus may be heard even by a user at a remote position. Stereo sound may be output through the first sound output unit 152a and the second sound output unit 152b.

The first sound output unit 152a may output sound at a first output power, which is a low output power, during a call. In the mono speaker mode, only the second sound output unit 152a may output sound. In the stereo speaker mode, the first sound output unit 152a may output sound together with the second sound output unit 152a at a second output power greater than the first output.

Figure 9:
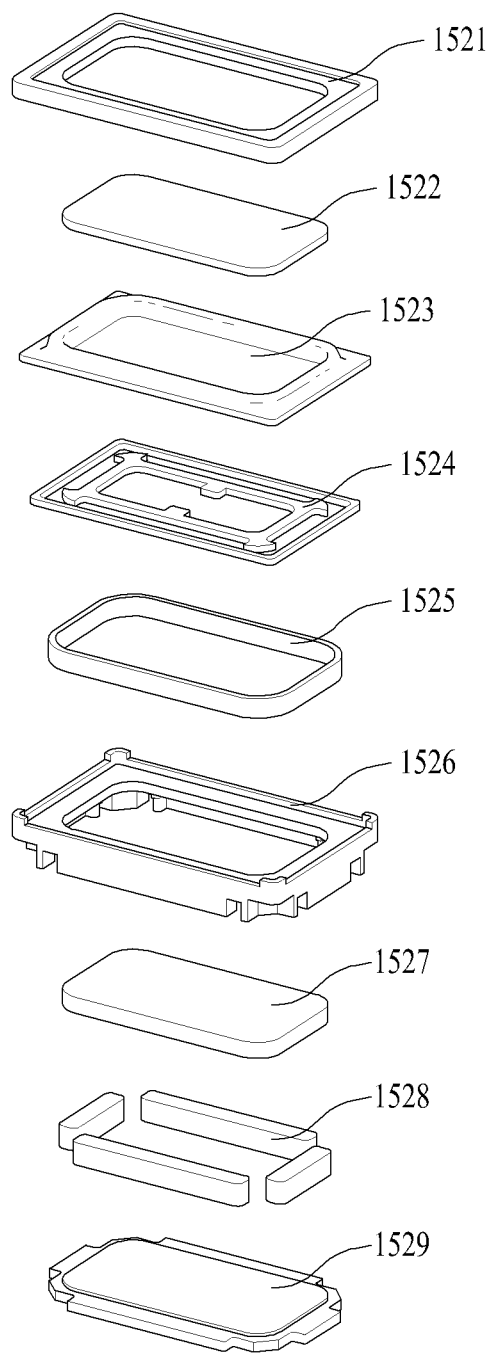
FIG. 9 is an exploded perspective view of an example of a second sound output unit according to an implementation of the mobile terminal of the present disclosure.
Figure 10A:
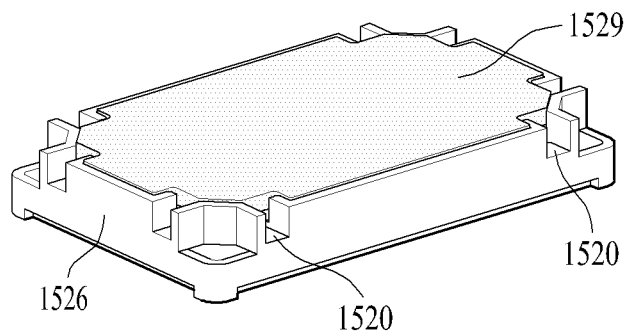
FIGS. 10A and 10B illustrate a perspective view and a rear view of an example of the second sound output unit according to an implementation of the present disclosure, which is viewed on the opposite side of the sound output unit.
Figure 10B:
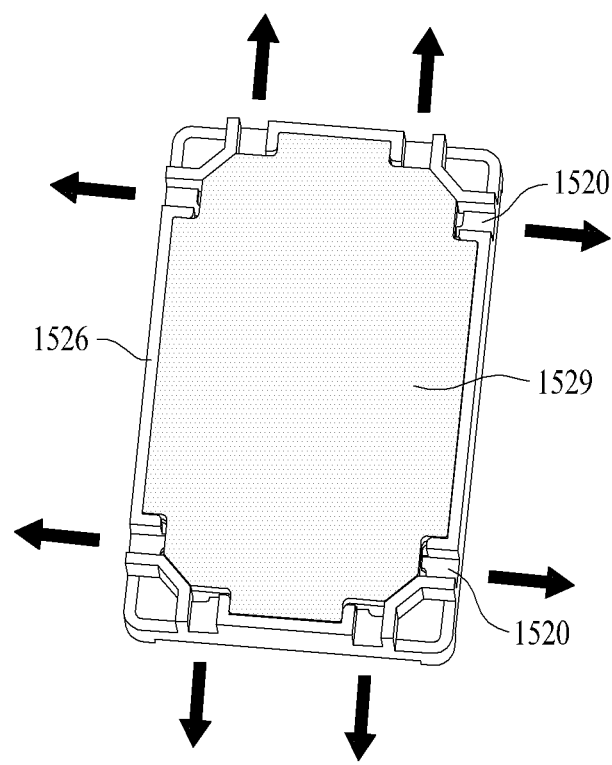

FIG. 9 is an exploded perspective view of a sound output unit 152 according to an implementation of the mobile terminal 100 of the present disclosure. FIGS. 10A and 10B show a perspective view and a rear view of the sound output unit 152 according to an implementation of the present disclosure, which is viewed from the opposite side of the sound output unit 152.

Referring to FIG. 9, the sound output unit 152 of the present disclosure may include a front protector 1521, a first diaphragm (center diaphragm) 1522, a second diaphragm (side diaphragm) 1523, a suspension 1524, a voice coil 1525, a side frame 1526, a center magnet 1527, a ring magnet 1528, and a yoke plate 1529.

When power is applied to the voice coil 1525, the diaphragms (the first diaphragm 1522 and the second diaphragm 1523) vertically vibrate by the magnetic field formed by the center magnet 1527 and the ring magnet 1528, as shown in FIG. 9, thereby generating sound. The first diaphragm 1522 is positioned at a central portion and the second diaphragm 1523 is positioned around the first diaphragm 1522. The first diaphragm 1522 is thicker than the second diaphragm 1523. The suspension 1524 uniformly distributes vibration of the diaphragms 1522 and 1523, thereby adjusting the acoustic characteristics and preventing vibration breakup.

The diaphragms 1522 and 1523 according to implementations of the present disclosure may be formed to be thicker than those of alternative design scenarios. Since the present disclosure uses a larger resonance space B2 than in alternative design scenarios, the elasticity of the air in the resonance space B2 is low and the amplitude of the diaphragms 1522 and 1523 are higher at the same applied voltage. If the amplitudes of the diaphragms 1522 and 1523 are high, the diaphragms 1522 and 1523 may be broken or distortion may occur in a band of low-pitched sound. Accordingly, thicker diaphragms 1522 and 1523 may be implemented to reduce the distortion.

In alternative mobile terminal designs, the sound output unit using a resonance space surrounded by the brackets uses a first diaphragm 1522 having a thickness of about 150 μm and a second diaphragm 1523 having a thickness of about 30 μm. By contrast, the diaphragms according to implementations of the present disclosure may be formed to be 1.5 to 2 times thicker than in the sound output unit of alternative mobile terminal designs. For example, in the present disclosure, the first diaphragm 1522 may have a thickness between 200 μm and 300 μm and the second diaphragm 1523 may have a thickness between 50 μm and 70 μm If the thickness of the diaphragms 1522 and 1523 is increased, low-frequency performance may be lowered. However, according to the present disclosure, since the resonance space B2 is sufficiently large, the first sound obtained by sufficiently amplifying the sound of the low frequency band may be output. Therefore, the quality of low-pitched sound may be improved compared to the alternative design structure, even if the thickness of the diaphragms 1522 and 1523 is increased.

The front protector 1521 protects the internal structure of the sound output unit 152 including the diaphragms 1522 and 1523 on the front side, while the side frame 1526 is positioned around the center magnet 1527, the ring magnet 1528 and the voice coil 1525 to provide a support structure of the outer periphery of the sound output unit 152. The yoke plate 1529 is positioned on the back of the sound output unit 152 and serves as a passage for the magnetic field to control the flow of the magnetic field formed by the center magnet and the ring magnet and improve the intensity of the magnetic field. Since pure iron is used for the passage for the magnetic field, the yoke plate 1529 may also serve to protect the opposite surface of the sound output unit 152.

Referring to FIGS. 10A and 10B, a resonance hole 1520 is formed in the side frame 1526 of the sound output unit 152 of the present disclosure. A resonance space is utilized to amplify the vibration in the space on the back of the diaphragms 1522 and 1523. The resonance hole 1520 is an opening formed in the sound output unit 152 to transmit vibration to the resonance space.

In some alternative mobile device cases, a resonance space is formed on the opposite surface of the sound output unit (e.g., sound output unit 152) by sound brackets and the resonance hole (e.g., resonance hole 1520) is formed in the yoke plate (e.g., yoke plate 1529). However, according to the present disclosure, as shown in FIG. 6, since the middle frame 105 is located on the opposite surface of the sound output unit 152, forming the resonance hole 1520 in the yoke plate may cause the resonance hole 1520 to abut the middle frame 105, thereby lowering resonance efficiency.

Therefore, the resonance hole 1520 may be formed in the side frame 1526 so as to be oriented in a lateral direction. As shown in FIGS. 10A and 10B, the side frame 1526 may be provided with depressed grooves on the opposite surface thereof coupled to the yoke plate 1529, and the grooves and the yoke plate 1529 may form the resonance hole 1520.

When the resonance hole 1520 is formed to face in the lateral direction, vibration of air caused by the diaphragms 1522 and 1523 may not be transmitted to the resonance hole 1520 since the resonance hole 1520 is surrounded by the ring magnet 1528. Thus, unlike the alternative scenarios, the ring magnet 1528 may be formed of a plurality of unit magnets such that the corners of the sound output unit 152 are left open. As the resonance hole 1520 is formed at the corners from which the outer magnet 1528 is removed, interference of the outer magnet 1528 with transmission of the vibration to the resonance space may be minimized.

Figure 11:
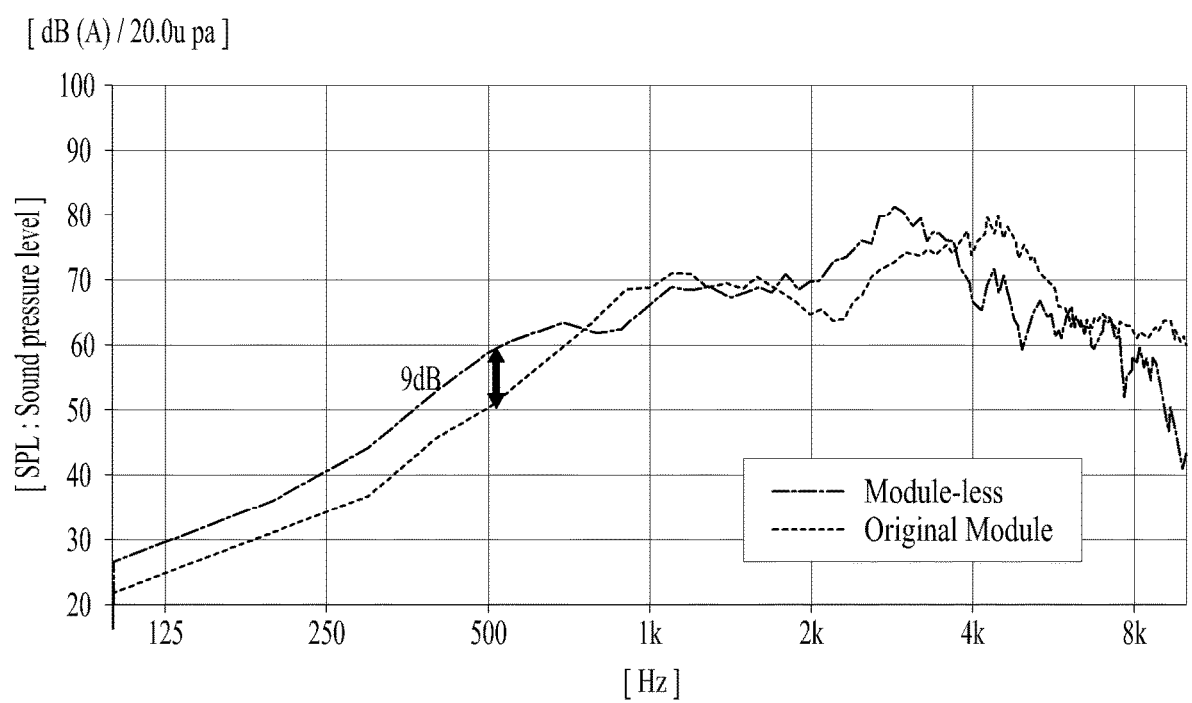
FIG. 11 is a graph depicting an example of sound pressure levels of output sound of the mobile terminal of the present disclosure as compared with an alternative mobile terminal design.

FIG. 11 is a graph depicting the sound pressure level (SPL) of sound output from an alternative mobile terminal design having the resonance space B1 surrounded by the sound brackets 153a and 153b, as compared with the SPL of sound output from the mobile terminal according to implementations of the present disclosure provided with the resonance space B2 by utilizing the inner space.

The mobile terminal 100 of the present disclosure employs a sound output unit (module-less unit) that uses the inner space of the main body as the resonance space B2 and is exposed to the resonance space as the sound output unit 152 by omitting a part of the sound brackets. The mobile terminal of the present disclosure outputs, through a sound hole (104a), a first sound obtained by causing the resonance space (B2) to resonate with the sound output from the sound output unit 152. The resonant frequency of the first sound is lower than that of sound output from the sound output unit (original module) of the alternative mobile terminal design. Referring to FIG. 11, in some implementations, in a low frequency region of 500 Hz, the sound output unit of the present disclosure obtains output power increased by about 9 dB over that of the alternative sound output unit design (increased three times over the output power of the sound output unit of alternative mobile terminal designs).

When the spatial volume of the resonance space shielded from the outside is reduced by a pressure exerted on the resonance space, a restoring force that acts to increase the spatial volume is produced. A sound output unit of appropriate output power is preferably used depending on the size of the resonance space (namely, depending on the restoring force of the resonance space). In a resonance space smaller than the proper resonance space of the sound output unit 152, air restoring power becomes larger. Therefore, a sound output unit 152 of a higher output power may be utilized since a stronger force may obtain sound of the same output power in the smaller resonance space.

Figure 12:
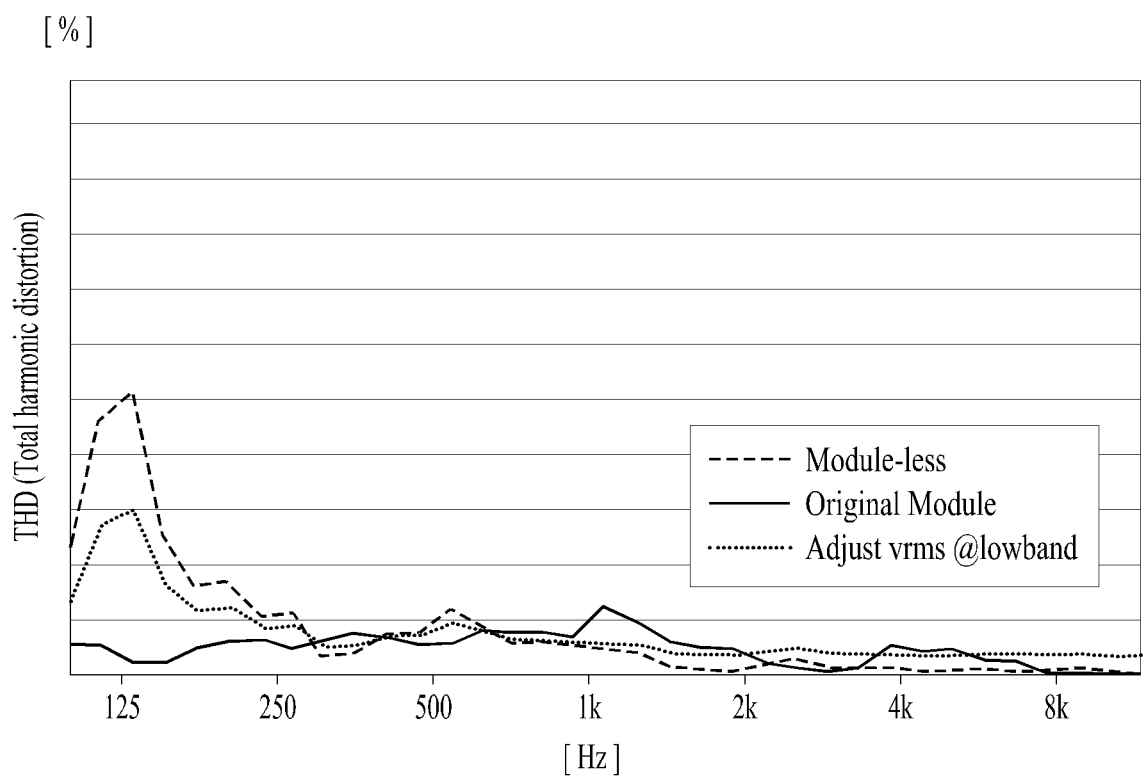
FIG. 12 is a graph depicting an example of total harmonic distortion (THD) representing distortion in the low-frequency sound band.

As the spatial volume of the resonance space increases, the output power also increases, but the amplitude increases at a specific frequency of low-pitched sound. Thereby, unnecessary harmonic components may be generated, causing distortion. FIG. 12 is a graph depicting total harmonic distortion (THD) according to the sound output unit 152. THD refers to the high frequency content of an output sound pressure when a sinusoidal wave of a certain voltage corresponding to the rated input is applied to the sound output unit and is expressed in percentage. THD refers to a signal that is applied through input is output due to nonlinearity of the device, and serves as an indicator of linearity and distortion of the device. THD provides a numeral value of accuracy of sound reproduced by the sound output unit 152. A greater numerical value generally corresponds to more noise.

When the resonance space is excessively large, an excessive amplitude may be produced, which may lower reliability and increase nonlinear distortion. As shown in the graph of FIG. 12, the sound output unit of the present disclosure may exhibit high THD in a low frequency band below 500 Hz. For example, in some implementations, in a low frequency band below 300 Hz, the THD increases by about 20-40% as compared with THD of the alternative sound output unit design, and thus the sound quality may be lowered.

Therefore, in the low frequency band below 300 Hz, the THD may be lowered by lowering the output voltage of the sound output unit 152 compared to the output voltage in the other frequency bands. When the output voltage is lowered at low frequency, the THD may be lowered, and therefore noise may be reduced. Moreover, since the output voltage is lowered, power consumption of the sound output unit 152 may be reduced.

Figure 13:
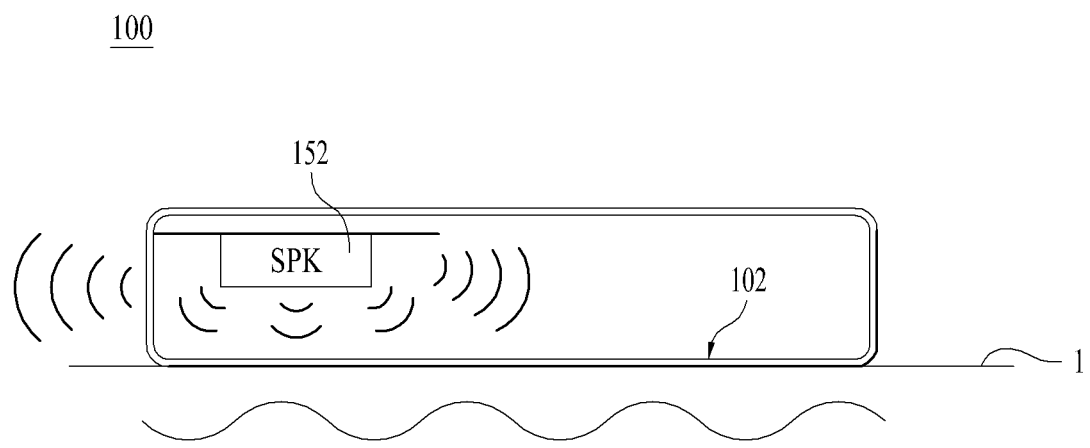
FIG. 13 illustrates an example of indirect vibration of the mobile terminal of the present disclosure.

FIG. 13 illustrates first indirect vibration and second indirect vibration of the mobile terminal 100 of the present disclosure. Since the sound output unit 152 of the present disclosure uses the inner space as the resonance space B2, vibration of the first sound is transmitted to the rear case 102 or the window 151a of the mobile terminal. Vibration of the first sound transmitted to the rear case 102 and the window 151a is referred to as first indirect vibration, and the vibrating rear case 102 and the vibrating window 151a may function as an auxiliary sound output unit 152 to output second sound.

Since the first indirect vibration vibrates the case thicker than the diaphragm of the sound output unit 152, the second sound output by the first indirect vibration has a lower frequency than the first sound. As the stiffness of the vibrating body is lowered, the density increases, and as the area increases, the resonant frequency tends to be decreased. When the stiffness is low, high output power may be obtained even with weak force. The back of the window 151a on the front surface of the sound output unit is supported by the display unit 151 and the middle frame 105, and thus the stiffness is high. Accordingly, the effect of the first indirect vibration is weaker than in the rear case 102.

For the first indirect vibration of the present disclosure, the rear case 102 preferably has a flat structure, and a glass material having low stiffness may be adopted for the rear case. However, the material of the case is not limited thereto and may include metal or polymer.

The first indirect vibration may cause the second sound having a lower frequency than the first sound to be output, and therefore may reinforce the weak low-pitched sound of the small sound output unit 152 mounted in the mobile terminal 100.

Components provided inside the mobile terminal 100 are also affected by the first indirect vibration. Particularly, the second sound may be input to the microphone 122 by the first indirect vibration. In order to prevent this, a soundproof member for absorbing the first indirect vibration of the mobile terminal may be provided around the microphone 122 to shield sound transmitted through the resonance space or sound caused by the first indirect vibration. Alternatively, the sound output from the sound output unit 152 may be removed from the sounds collected by the microphone 122 using software to collect only filtered sound.

In the first state wherein the user holds the mobile terminal 100 in his hand, second sound due to the first indirect vibration, which is the vibration of the case itself, is added, and accordingly the sound output from the mobile terminal may become richer. In particular, the first indirect vibration has a higher SPL in a lower frequency band than the sound output unit 152 (see FIG. 14), and the sound quality of the low frequency band in the sound output from the mobile terminal may be improved.

In a second state in which the mobile terminal 100 is placed on a mounting surface 1, the second indirect vibration refers to vibration that is generated when the mounting surface 1 subjected to the first indirect vibration of the mobile terminal 100 moves. The resonant frequency of third sound output by the second indirect vibration may vary depending on the stiffness, density, and area of the mounting surface 1 and the properties and area of the surface of the mobile terminal 100 that contacts the mounting surface.

Since the second indirect vibration is generated by transmission of the first indirect vibration, the second indirect vibration becomes larger as the area of the surface in contact with the surface causing the first indirect vibration increases. Therefore, when the rear surface of the mobile terminal 100 contacts the mounting surface 1, the second indirect vibration becomes larger than when the front surface of the mobile terminal 100 contacts the mounting surface 1. When only a part of the rear surface contacts the front surface 1 or is bent, the second indirect vibration becomes smaller than when the whole rear surface contacts the mounting surface 1.

Figure 14:
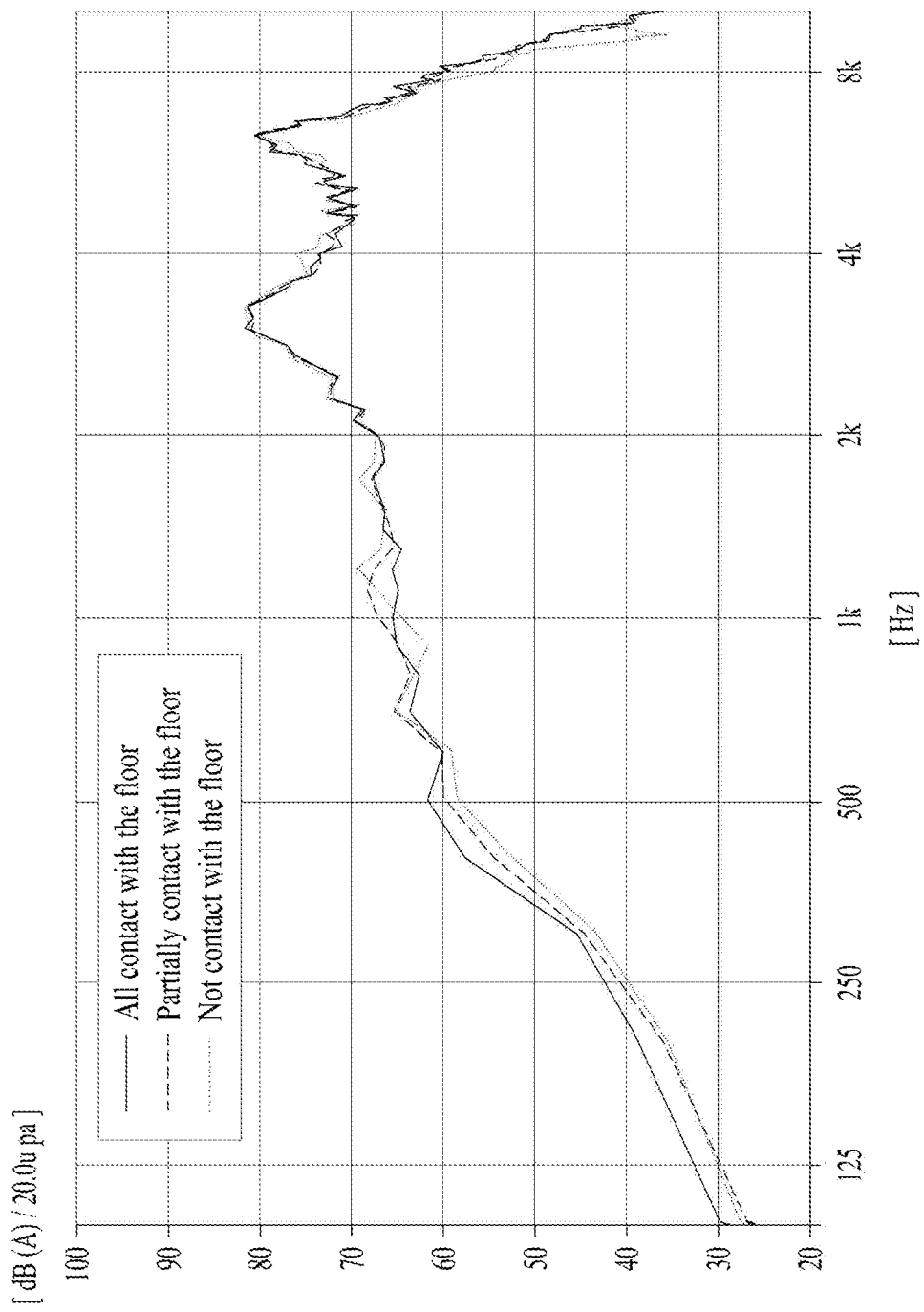
FIG. 14 is a graph depicting an example of the effect of second indirect vibration according to an area contacting a mounting surface.

FIG. 14 is a graph depicting the effect of second indirect vibration according to the area of the case of the mobile terminal that contacts a mounting surface. In a first state ("Not in contact with the floor") in which the mobile terminal is not placed on the mounting surface, the resonant frequency of the third sound is about 700 Hz. When the entire rear case of the mobile terminal is arranged to contact the mounting surface ("All contact with the floor"), the resonant frequency of the third sound is 500 Hz. The SPL of the low-pitched sound (below 1 kHz) is improved by about 1 dB to 5 dB on average, depending on whether the mobile terminal is mounted on the mounting surface.

When only a part of the case is arranged to contact the mounting surface 1 ("Partial contact with the floor"), the resonant frequency of the third sound is between the resonant frequency given when the entire area of the case contacts the mounting surface and the resonant frequency given when the case does not contact the mounting surface. In the 500 Hz frequency band, the highest output power is obtained when the entire surface of the case contacts the mounting surface, and the next highest SPL is obtained when only a part of the case contacts the mounting surface. The lowest SPL is obtained when the case is not mounted on the mounting surface.

Therefore, in order to maximize the effect of the second indirect vibration, the entire area of the rear case is preferably brought into contact with the mounting surface 1.

In order to make as wide an area of the rear case 102 as possible contact the mounting surface 1, the camera glass covering the rear camera 121*a* located on the rear surface of the mobile terminal or the rear button 123*c* may be positioned in the same plane as or a lower plane than the rear case 102 so as not to protrude from the rear case 102. If the camera glass or the rear button protrudes from the rear case 102, the rear case 102 may be spaced apart from the mounting surface, and thus the first indirect vibration is not transmitted to the mounting surface. As a result, the second indirect vibration may not be generated.

Figure 15:
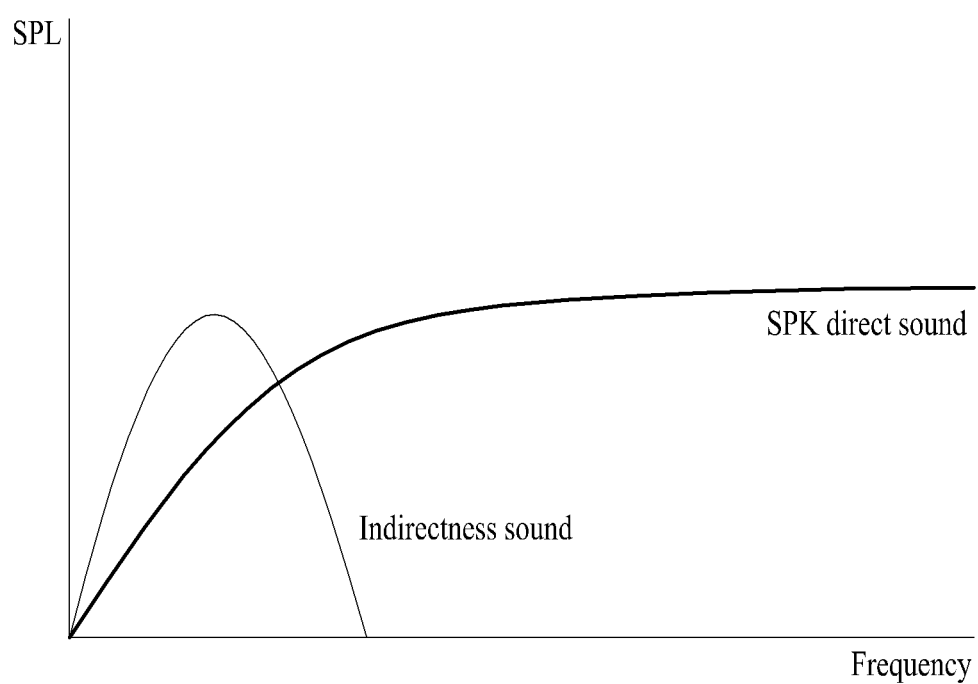
FIG. 15 is a graph depicting an example of a sound pressure level according to indirect vibration of the mobile terminal of the present disclosure.

FIG. 15 is a graph depicting a sound pressure level according to indirect vibration of the mobile terminal 100 of the present disclosure. Since the vibration of the low frequency band has a large amplitude, the vibration transmitted to the case of the mobile terminal 100 or the mounting surface 1 may mainly be in the low frequency band. That is, the second sound and the third sound output by the indirect vibration exhibiting the greatest output power in the range lower than the resonant frequency of the sound output unit. The low-pitched sound reaching the limitation thereof in the first sound output from the sound output unit 152 may be reinforced through the first indirect vibration of the case and the second indirect vibration of the mounting surface.

Figure 16:
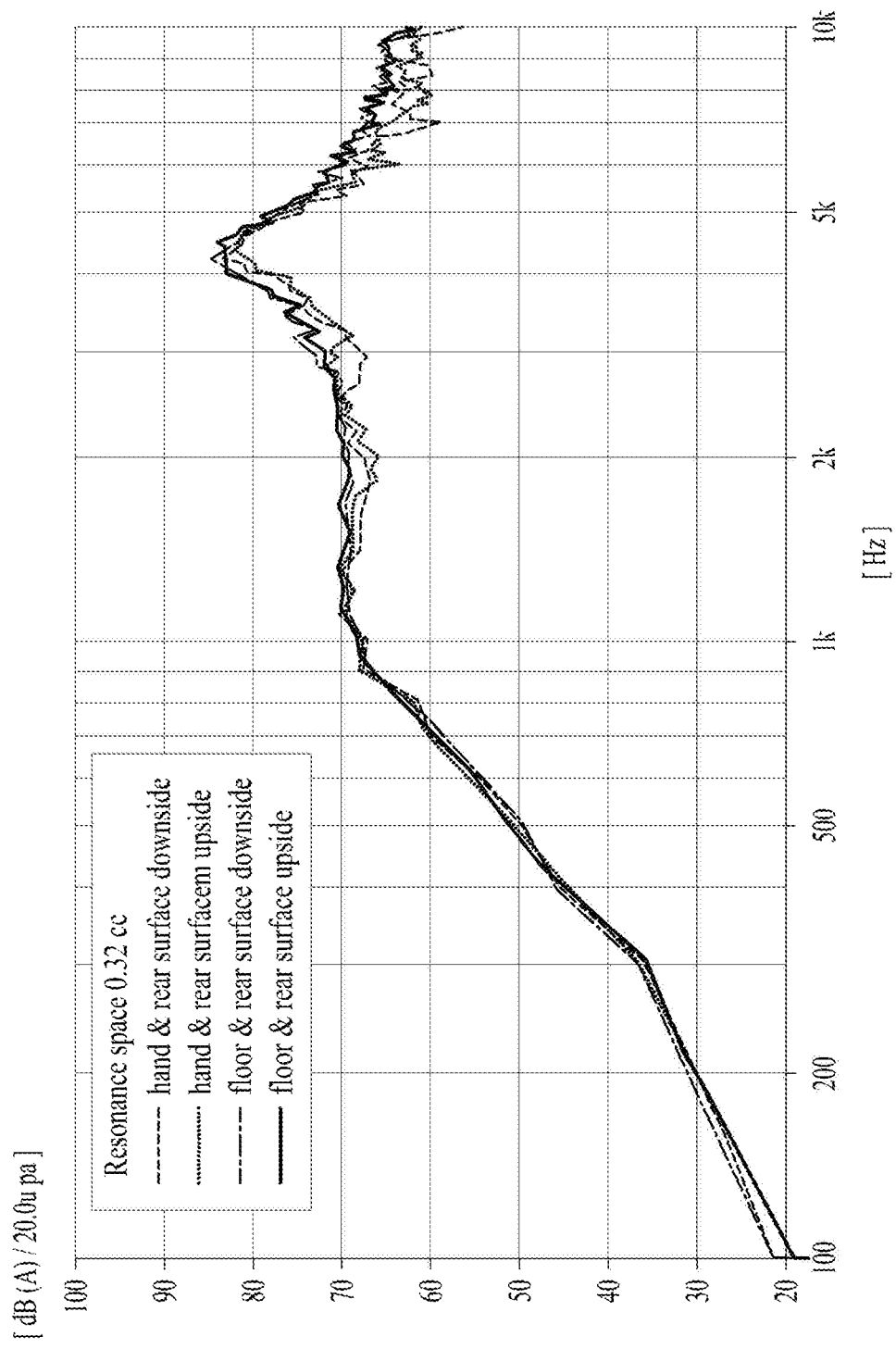
FIG. 16 is a graph depicting an example of a sound pressure level according to the mounting state of an alternative mobile terminal design.
Figure 17:
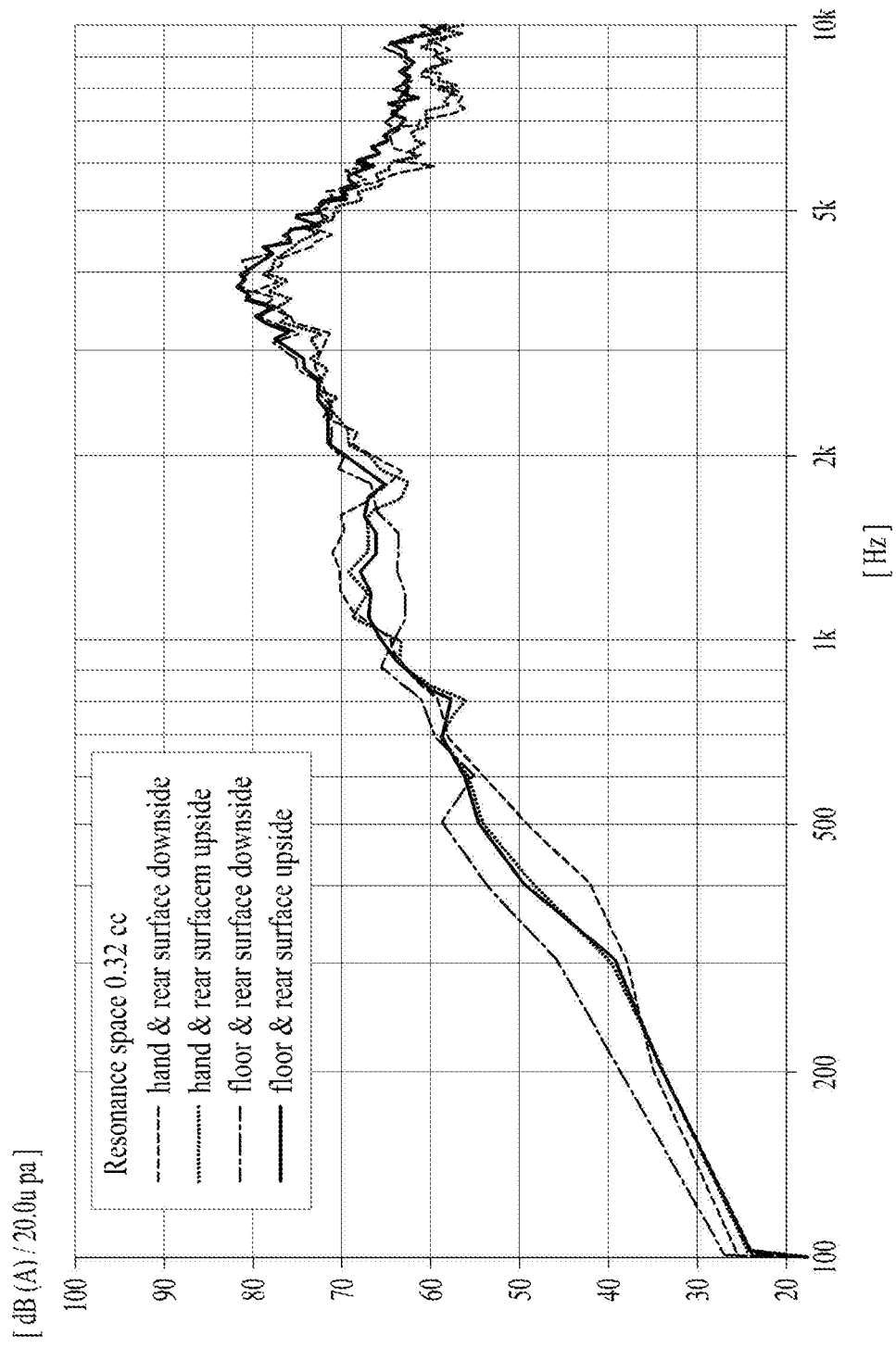
FIG. 17 is a graph depicting an example of a sound pressure level according to the mounting state of the mobile terminal according of the present disclosure.

FIG. 16 is a graph depicting an SPL according to the mounting state according to an alternative mobile terminal design, and FIG. 17 is a graph depicting an SPL according to the mounting state of the mobile terminal 100 of implementations in the present disclosure. The figures show the SPLs in four scenarios according to the direction in which the rear surface of the mobile terminal 100 faces, depending on whether the mobile terminal 100 is held or mounted on the mounting surface 1.

As shown in FIG. 16, in an alternative mobile terminal design, the resonance space B1 surrounded by the sound brackets 153*a* and 153*b* (FIG. 3) does not transmit vibration of the sound output unit 152 to the housing and thus does not cause indirect vibration. The SPL does not vary greatly depending on the mounting position (hand/floor) and the mounting direction (upside/downside) of the rear case 102 of the mobile terminal 100.

By contrast, as shown in FIG. 17, the SPL of the mobile terminal 100 according to implementations of the present disclosure which uses the inner space as the resonance space B2 varies depending on the mounting position of the mobile terminal 100 or the direction in which the rear surface of the mobile terminal faces. When the user holds the mobile terminal, the second indirect vibration hardly occurs, and thus a similar performance is obtained irrespective of the direction in which the rear surface faces.

However, when the mobile terminal is mounted on the mounting surface 1, the SPL varies depending on the mounting direction because the effect of the second indirect vibration varies depending on the mounting direction. When the mounting surface 1 and the rear case 102 are not in contact with each other and the rear surface of the mobile terminal 100 faces upward, the effect of the second indirect vibration is insignificant and the SPL of low-pitched sound is hardly changed.

However, it can be seen that the SPL rises at 500 Hz when the rear surface of the mobile terminal faces downward ("floor & rear surface down") such that the mounting surface 1 and the rear case 102 face each other. This is a result of the second indirect vibration caused by contact between the rear case 102 and the mounting surface 1 and low-pitched sound reinforced by the third sound.

If sound is output from the mobile terminal 100 without the mobile terminal 100 contacting the mounting surface 1 or with the front surface of the mobile terminal 100 contacting the mounting surface 1, a notification for guiding the user to seat the mobile terminal 100 on the mounting surface 1 of a thin plate may be provided to the user. A guide message may be output through the display unit 151. If the display unit 151 is placed so as not to be seen, the sound output unit 152 may output a notification sound.

FIG. 18 is a graph depicting the amplitude of vibration generated by the sound output unit 152 of the present disclosure. The amplitude becomes large in the frequency band below 1000 Hz and the largest amplitude appears at the resonant frequency (500 Hz in FIG. 18). Since high-frequency sound has a high frequency and a small amplitude, its influence on the first indirect vibration is insignificant, while low-frequency vibration forms the first indirect vibration.

When the amplitude is large in the low-pitched sound band, the low-pitched sound is reinforced, and thus increased sound may be output. However, in the second state in which the user holds the mobile terminal 100 in his hand, the first indirect vibration may cause discomfort. As such, the mobile device may be configured to limit the first indirect vibration to mitigate such discomfort. As shown in FIG. 18, when the voltage is lowered, the amplitude of the low-pitched sound is reduced. Therefore, the first indirect vibration may be reduced by lowering the voltage when the low-pitched sound is output.

The controller 180 may output, to the display unit 151, a menu for selecting limiting the first indirect vibration, and thus allow the user to selectively activate the first indirect vibration. Once the user selects a menu item for limiting the first indirect vibration, the controller may minimize the first indirect vibration by lowering the output voltage of the sound output unit 152 in the low-frequency sound range.

That is, if the user enables a boom box function that improves the quality of the low-pitched sound band through the first indirect vibration, the output power of the low-pitched sound may be increased. However, if the user disables the boom box function, the output power of the low-pitched sound may be decreased, and thus the first indirect vibration may be minimized. The display unit may set the boom box function or provide a menu for limiting the first indirect vibration to allow the user to selectively enable the function of sound quality improvement using the first indirect vibration.

Figure 19A:
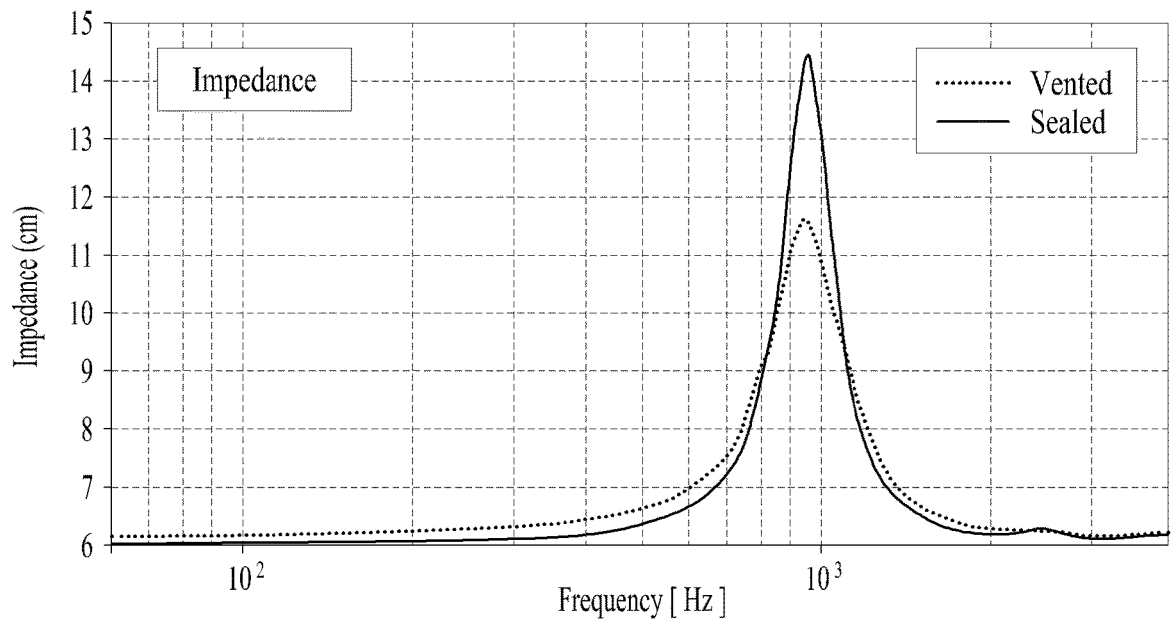
FIGS. 19A and 19B illustrate graphs depicting examples of impedance curves and amplitudes according to whether or not the mobile terminal of the present disclosure undergoes sound leakage.
Figure 19B:
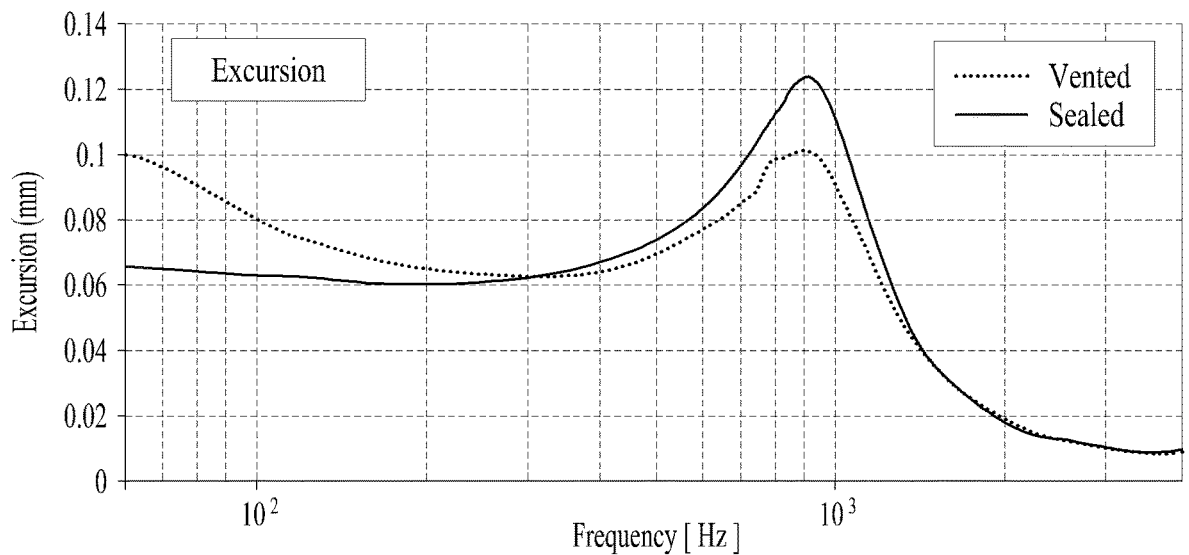

FIG. 19A shows an impedance curve according to whether sound leakage occurs in the mobile terminal 100 according to the present disclosure, and FIG. 19B shows an amplitude curve according to whether sound leakage occurs in the mobile terminal 100 according to the present disclosure.

In some alternative scenarios, sound leakage may be affected depending on whether or not the sound brackets (e.g., sound brackets 153a and 153b) surrounding the sound output unit (e.g., sound output unit 152) are shielded. However, according to some implementations in the present disclosure, since the resonance space B2 is formed using the entire mobile terminal 100, sound leakage may be prevented when the mobile terminal 100 is waterproof.

Since the speaker is made up of the voice coil 1525, the impedance of the voice coil 1525 can be calculated when a voltage is applied. The impedance of the voice coil 1525 may vary depending on the frequency, and the impedance has the peak value at the resonant frequency. The state of the resonance space may be identified by continuously receiving feedback of the impedance of the sound output unit 152, which may change when the power is applied to the sound output unit 152. Since the impedance varies depending on the state of the resonance space, it may be determined that a change has occurred in the resonance space if there is a change in impedance.

As shown in FIG. 19A, when sound leakage occurs, the impedance value at the resonant frequency is decreased. When this change is detected on the impedance curve, it may be determined that there is a crack in the resonance space, and the power applied to the voice coil may be adjusted to be optimized for the changed resonance space B2. That is, even when sound leakage occurs in the resonance space B2 due to breakage, the sound output unit 152 may be used by adjusting the voltage until the mobile terminal 100 is repaired.

FIG. 19B shows an amplitude curve of vibration of the diaphragm, where the largest amplitude appears at the resonant frequency. When sound leakage occurs because the resonance space B2 is not shielded, the amplitude at low frequencies below 100 Hz becomes large and the amplitude at the resonant frequency becomes small. As described above, it may be determined whether the mobile terminal 100 is sufficiently waterproof, based on change in amplitude at low frequencies below 100 Hz or the impedance value at the resonant frequency. In some alternative scenarios, the process of passing through the air pressure chamber is often utilized to determine whether the mobile terminal 100 is waterproof. According to implementations in the present disclosure, this process may be replaced with a process of checking the impedance value of the sound output unit 152, thereby simplifying the manufacturing process.

In addition, since waterproofness of the mobile terminal can be checked based on the impedance of the voice coil 1525, the user may be warned when there is a problem in waterproofing.

The present disclosure may provide a mobile terminal 100 configured to improve the quality of output sound by securing a sufficient resonance space for the sound output unit 152.

Further, the present disclosure may provide a model terminal 100 configured to overcome the weakness of alternative designs of the sound output unit 152 by utilizing not only diaphragms 1522 and 1523 of the sound output unit 152 but also the mobile terminal 100 itself or the mounting surface 1 on which the mobile terminal 100 is mounted.

The foregoing detailed description should not be construed as limitative and should be considered illustrative. It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A mobile terminal comprising:
   a case unit comprising a plurality of case parts defining an outer appearance;
   a display unit mounted on a front surface of the case unit;
   a waterproof member configured to waterproof a gap between the plurality of case parts;
   an inner space formed by coupling of the plurality of case parts with the waterproof member;
   a sound output unit mounted in the inner space;
   an electronic component mounted in the inner space;
   at least one processor configured to control the sound output unit;
   a resonance space being remaining space in which the electronic component is mounted in the inner space and configured to resonate sound that is output from the sound output unit; and
   a sound hole provided at one side of the case unit and configured to output a first sound,
   wherein the case unit comprises:
   a side case covering a lateral surface of the case unit;
   a rear case positioned on a rear surface of the case unit and having a flat surface;
   a window positioned on the front surface to cover the display unit,
   wherein the waterproof member comprises a waterproof ring or a waterproof tape positioned between the side case and the rear case; and
   wherein the resonance space is configured to be in contact with the rear case.

2. The mobile terminal according to claim 1, further comprising:
   a vent hole that is formed in the case unit and configured to balance an air pressure between an outside and the inner space; and
   a mesh configured to restrict a liquid from passing therethrough and to allow a gas to pass therethrough, the mesh covering the vent hole.

3. The mobile terminal according to claim 1, wherein a sound pressure level of a second sound that is output by vibration of the case unit due to vibration of the first sound is higher than a sound pressure level of the first sound in a low-frequency sound range, and
   wherein, in a state in which the case unit is placed on a mounting surface, a third sound is generated by the mounting surface due to vibration of the second sound.

4. The mobile terminal according to claim 3, wherein the case unit is configured to, as an area of the case unit contacting the mounting surface increases, generate an increased sound pressure level of the third sound.

5. The mobile terminal according to claim 4, wherein, in a first state in which the rear case contacts the mounting surface, the sound pressure level of the third sound is higher than in a second state in which the window contacts the mounting surface.

6. The mobile terminal according to claim 5, wherein the rear case comprises a glass material.

7. The mobile terminal according to claim 5, wherein the at least one processor is further configured to:
in a state in which sound is output through the sound output unit, control the display unit to output a message indicating that the rear surface of the case unit should be arranging to face the mounting surface.

8. The mobile terminal according to claim 3, wherein the at least one processor is further configured to:
control the display unit to output a menu for inputting a user command to restrict vibration of the case unit or restrict the second sound; and
based on the user command being input, lower an output voltage of the sound output unit at a resonant frequency of the third sound.

9. The mobile terminal according to claim 3, wherein the low-frequency sound range is below 1000 Hz.

10. The mobile terminal according to claim 1, wherein the at least one processor is further configured to adjust an output voltage of the sound output unit to a lower value in a sound range below 300 Hz.

11. The mobile terminal according to claim 1, further comprising:
a battery mounted in the inner space,
wherein the resonance space comprises:
a first resonance space positioned below the battery;
a second resonance space connected to the first resonance space and positioned on a lateral surface of the battery; and
a third resonance space connected to the second resonance space and positioned over an upper surface of the battery.

12. The mobile terminal according to claim 1, wherein the sound output unit comprises a first sound output unit and a second sound output unit,
wherein, in a call mode, the mobile terminal is configured to output sound at a first output power through the first sound output unit,
wherein, in a mono speaker mode, the mobile terminal is configured to output sound through the second sound output unit, and
wherein, in a stereo speaker mode, the mobile terminal is configured to output sound through the second sound output unit and simultaneously output at a sound output power greater than the first output power through the first sound output unit.

13. The mobile terminal according to claim 12, wherein the sound output unit comprises the first sound output unit and the second sound output unit, and
wherein the resonance space is divided into a fourth resonance space connected to the first sound output unit and a fifth resonance space connected to the second sound output unit.

14. The mobile terminal according to claim 1, wherein the case unit comprises the plurality of case parts, and
wherein the waterproof member comprises a waterproof tape, a waterproof adhesive, resin, rubber, or a waterproof ring disposed between the plurality of case parts.

15. The mobile terminal according to claim 1, further comprising:
a camera comprising a camera glass configured to cover a camera hole formed in the rear surface of the case unit,
wherein the camera glass is arranged in the same plane as the rear surface of the case unit.

16. A mobile terminal comprising:
a case unit comprising a plurality of case parts defining an outer appearance;
a display unit mounted on a front surface of the case unit;
a waterproof member configured to waterproof a gap between the plurality of case parts;
an inner space formed by coupling of the plurality of case parts with the waterproof member;
a sound output unit mounted in the inner space;
an electronic component mounted in the inner space;
at least one processor configured to control the sound output unit;
a resonance space being remaining space in which the electronic component is mounted in the inner space and configured to resonate sound that is output from the sound output unit; and
a sound hole provided at one side of the case unit and configured to output a first sound,
wherein the sound output unit comprises:
a diaphragm positioned on one surface;
a voice coil positioned on a rear surface of the diaphragm;
a ring magnet positioned outside the voice coil;
a frame configured to expose the diaphragm and to cover a lateral surface and a rear surface of the ring magnet and the voice coil; and
a resonance hole formed in a lateral direction of the frame.

17. The mobile terminal according to claim 16, wherein the frame comprises:
a side frame positioned around a lateral surface of the sound output unit and comprising a depressed groove on an opposite surface of the sound output unit; and
a yoke plate coupled to an opposite surface of the side frame,
wherein the resonance hole is defined as an opening between the depressed groove and the yoke plate.

18. The mobile terminal according to claim 16, wherein the resonance hole is defined at a corner of the sound output unit, and
wherein the ring magnet comprises a plurality of unit magnets spaced apart from the corner.

19. The mobile terminal according to claim 16, further comprising:
a sound bracket comprising a sound passage covering one surface of the sound output unit and extending between the sound hole and the diaphragm, the sound bracket exposing the opposite surface of the sound output unit to the resonance space.

20. The mobile terminal according to claim 16, wherein the diaphragm comprises:
a first diaphragm positioned at a center; and
a second diaphragm positioned at a periphery,
wherein a thickness of the first diaphragm is between 200 µm and 300 µm, and
wherein a thickness of the second diaphragm is between 50 µm and 70 µm.

* * * * *